(12) United States Patent
Fernandino et al.

(10) Patent No.: US 12,702,944 B2
(45) Date of Patent: Aug. 11, 2026

(54) SEPARATOR FOR A MULTI-PHASE FLOW

(71) Applicant: InnSep AS, Trondheim (NO)

(72) Inventors: Maria Fernandino, Ranheim (NO); Carlos A. Dorao, Ranheim (NO)

(73) Assignee: InnSep AS, Trondheim (NO)

( * ) Notice: Subject to any disclaimer, the term of this patent is extended or adjusted under 35 U.S.C. 154(b) by 448 days.

(21) Appl. No.: 18/140,455

(22) Filed: Apr. 27, 2023

(65) Prior Publication Data

US 2023/0330580 A1 Oct. 19, 2023

Related U.S. Application Data

(63) Continuation of application No. PCT/EP2021/080260, filed on Nov. 1, 2021.

(30) Foreign Application Priority Data

Oct. 30, 2020 (GB) ..................................... 2017217
Oct. 30, 2020 (GB) ..................................... 2017231

(Continued)

(51) Int. Cl.
*B01D 45/14* (2006.01)
*B01D 46/00* (2022.01)
*B01D 50/20* (2022.01)

(52) U.S. Cl.
CPC ......... *B01D 46/0056* (2013.01); *B01D 45/14* (2013.01); *B01D 46/0031* (2013.01); *B01D 50/20* (2022.01); *B01D 2273/30* (2013.01)

(58) Field of Classification Search
CPC ................ B01D 46/0056; B01D 45/14; B01D 46/0031; B01D 50/20; B01D 2273/30;

(Continued)

(56) References Cited

U.S. PATENT DOCUMENTS 3,447,290 A * 6/1969 Flory ..................... B01D 45/14
55/432
4,049,401 A * 9/1977 Smith ................... F16N 39/002
55/525

(Continued)

FOREIGN PATENT DOCUMENTS

CA 2313903 A1 1/2001
CN 201371017 Y 12/2009

(Continued)

OTHER PUBLICATIONS

International Search Report and Written Opinion, International Application No. PCT/EP2021/080260, mailed Apr. 14, 2022.

(Continued)

*Primary Examiner* — Dung H Bui
(74) *Attorney, Agent, or Firm* — MARSHALL, GERSTEIN & BORUN LLP

(57) ABSTRACT

A separator for separating a multi-phase flow comprises: a first chamber at an upstream end of the separator, the first chamber comprising an inlet for an inlet flow to enter the first chamber; a second chamber at a downstream end of the separator, the second chamber comprising an outlet for a separated gas flow to exit the second chamber; and a mesh located between the first chamber and the second chamber for separating phases of the multi-phase flow, wherein the mesh is configured to receive the multi-phase flow from the first chamber at an upstream face of the mesh, and is configured to allow the separated gas flow to flow into the second chamber from a downstream face of the mesh.

18 Claims, 14 Drawing Sheets

(30) Foreign Application Priority Data

Oct. 30, 2020 (GB) ...................................... 2017239
Oct. 30, 2020 (GB) ...................................... 2017240

(58) Field of Classification Search
CPC ...... B01D 46/003; B01D 50/10; B01D 46/10; B01D 47/16
See application file for complete search history.

(56) References Cited

U.S. PATENT DOCUMENTS

| | | | | |
|---|---|---|---|---|
| 4,299,603 | A | 11/1981 | Friesen | |
| 5,716,423 | A * | 2/1998 | Krul | B01D 45/14 55/487 |
| 5,888,261 | A | 3/1999 | Fortune | |
| 6,159,258 | A * | 12/2000 | Ager | F02M 35/024 55/318 |
| 6,251,168 | B1 | 6/2001 | Birmingham et al. | |
| 6,517,612 | B1 * | 2/2003 | Crouch | B01D 63/16 55/528 |
| 6,627,166 | B1 | 9/2003 | Simon | |
| 6,858,056 | B2 * | 2/2005 | Kwan | B01D 45/14 55/400 |
| 6,893,478 | B2 * | 5/2005 | Care | F01M 13/04 55/401 |
| 9,168,475 | B2 | 10/2015 | Dorao et al. | |
| 2005/0204917 | A1 | 9/2005 | Haland et al. | |
| 2006/0196154 | A1 * | 9/2006 | Benedictus | A47L 9/1608 55/337 |
| 2007/0289632 | A1 * | 12/2007 | Della Casa | B01D 17/0208 137/173 |
| 2009/0196806 | A1 | 8/2009 | Larnholm et al. | |
| 2012/0151887 | A1 | 6/2012 | Dorao et al. | |
| 2012/0204723 | A1 | 8/2012 | Angst | |
| 2013/0167816 | A1 * | 7/2013 | Dawar | F01M 13/04 123/573 |
| 2014/0190136 | A1 * | 7/2014 | Zecchi | B01D 46/26 55/400 |
| 2016/0376922 | A1 | 12/2016 | Belfield | |
| 2018/0117512 | A1 * | 5/2018 | Janakiraman | B01D 46/003 |
| 2018/0140986 | A1 * | 5/2018 | Parikh | B01D 46/003 |
| 2020/0016522 | A1 | 1/2020 | Pepper | |
| 2020/0171420 | A1 * | 6/2020 | Holm | B01D 46/0056 |
| 2021/0111617 | A1 * | 4/2021 | Mitri | H02K 49/108 |
| 2021/0331113 | A1 * | 10/2021 | Narihata | B01D 46/62 |
| 2021/0351730 | A1 * | 11/2021 | Markunas | H02P 9/102 |
| 2022/0090820 | A1 * | 3/2022 | Gulliksen | B01D 46/0005 |
| 2023/0001356 | A1 * | 1/2023 | Berti Perez | B01D 61/18 |
| 2023/0151528 | A1 * | 5/2023 | Kim | D06F 33/43 68/3 R |
| 2023/0182708 | A1 * | 6/2023 | Kokrehel | F16D 65/18 188/72.9 |

FOREIGN PATENT DOCUMENTS

| | | | |
|---|---|---|---|
| CN | 105903290 | A | 8/2016 |
| CN | 106512565 | A | 3/2017 |
| CN | 206045715 | U | 3/2017 |
| CN | 206492349 | U | 9/2017 |
| CN | 210584090 | U | 5/2020 |
| DE | 19958514 | A1 | 6/2001 |
| DE | 102011016893 | A1 | 10/2012 |
| EP | 2463008 | A1 | 6/2012 |
| GB | 1369439 | A | 10/1974 |
| JP | H0283011 | A | 3/1990 |
| JP | H1066818 | A | 3/1998 |
| JP | 2012055839 | A | 3/2012 |
| MX | PA00006872 | A | 10/2004 |
| NO | 20092260 | A | 12/2010 |
| RU | 2668024 | C1 | 9/2018 |
| WO | WO-2010/143978 | A1 | 12/2010 |
| WO | WO-2018/225079 | A1 | 12/2018 |
| WO | WO-2020/195421 | A1 | 10/2020 |

OTHER PUBLICATIONS

Search Report, GB Application No. 2017239.1, dated Apr. 27, 2021.
Search Report, GB Application No. 2017239.1, dated Feb. 28, 2022.
Search Report, GB Application No. 2017240.9, dated Apr. 27, 2021.
Search Report, GB Application No. 2017240.9, dated Feb. 28, 2022.
Search Report, GB Application No. 2017231.8, dated Apr. 27, 2021.
Search Report, GB Application No. 2017217.7, dated May 4, 2021.
Search Report, GB Application No. 2017217.7, dated Nov. 24, 2021.
Error in Search Report, GB Application No. 2017217.7, dated Mar. 25, 2022.

* cited by examiner 420
100
410
400

SEPARATOR FOR A MULTI-PHASE FLOW

FIELD OF THE DISCLOSURE

The present application relates to a separator for a multi-phase flow, for example, a flow of gas in which is entrained liquid droplets.

BACKGROUND

Many disparate applications require separation of contaminants from a gas flow.

WO 2010/143978 A1 discloses a separator for separating liquid droplets from a flow of gas in which the liquid droplets are entrained. The separator comprises a mesh which rotates about an axis and through which the gas flow with entrained liquid droplets passes in the axial direction. The liquid droplets coalesce as they pass through the rotating mesh and are centrifuged and caused to travel radially outward towards the periphery of the rotating mesh. The resulting flow of coalesced droplets is collected on a wall surrounding the periphery of the rotating mesh, and drained therefrom.

Thus, whilst the gas passes axially through the mesh, the liquid droplets are coalesced and centrifuged by the rotating mesh and allowed to escape radially out of the path of the gas flow. As a result, re-entrainment of droplets into the gas flow is largely avoided, because the liquid droplets reside for only a short period of time within the rotating mesh.

In general, it is desirable to further improve the operation of known separators, for example to improve the separation efficiency.

SUMMARY

According to a first aspect of the invention, there is provided a separator for separating a multi-phase flow, the separator comprising: a first chamber at an upstream end of the separator, the first chamber comprising an inlet for an inlet flow to enter the first chamber; a second chamber at a downstream end of the separator, the second chamber comprising an outlet for a separated gas flow to exit the second chamber; a mesh located between the first chamber and the second chamber for separating phases of the multi-phase flow, wherein the mesh is configured to receive the multi-phase flow from the first chamber at an upstream face of the mesh, and is configured to allow the separated gas flow to flow into the second chamber from a downstream face of the mesh, wherein the upstream face of the mesh is spaced apart from the inlet into the first chamber by a distance $H_1$, wherein $H_1$ is related to the mesh diameter d by the following relationship:

$$H_1>0.5d.$$

The distance $H_1$ may be the perpendicular distance between two parallel planes, the first plane being the plane defined at an end of the inlet closest to the mesh, and the second plane being the plane defined by the upstream face of the mesh.

Such an arrangement (with the upstream face of the mesh spaced apart from the inlet into the first chamber by a distance $H_1$) leads to improved separation efficiency.

In some embodiments, the inlet projects into the first chamber, such that the first plane lies within the first chamber, offset from an upstream wall of the first chamber.

Optionally $H_1$ is less than ten times the mesh diameter, or less than five times the mesh diameter, or less than four times the mesh diameter, or less than three times the mesh diameter.

Optionally $H_1$ is approximately twice the mesh diameter, i.e. $H_1$ is approximately equal to 2d. This has been found to provide particularly efficient separation. When $H_1$ is increased to values greater than 2d, separation efficiency remains broadly the same, but the size of the separator increases. It is generally desirable for the separator to be as small as possible, whilst also providing the necessary level of separation efficiency. The necessary level of separation efficiency depends on the particular use of the separator.

Optionally, the second chamber at least partially projects into the first chamber by a distance $H_2$, wherein $H_2$ is related to a diameter d of the mesh by the following relationship: $0.5d<H_2$.

Here, $H_2$ is the perpendicular distance between a plane defined by the downstream face of the mesh and a parallel plane defined by walls partitioning the first chamber from the second chamber, at the downstream end of the first chamber. These partitioning walls close off the first chamber at its downstream end.

By virtue of the second chamber projecting (at least partially) into the first chamber, the first chamber is notionally divided into two sections. The upstream section (upstream of the plane defined by the upstream face of the mesh) is generally an open space bounded by the upstream wall and sidewall(s) of the first chamber (as well as the inlet wall(s), in embodiments where the inlet projects into the first chamber). The downstream section is an annular space, defined between the side walls of the first chamber and the sidewalls of the second chamber projecting into the first chamber, and between the side walls of the first chamber and the sidewalls of the mesh. The form of this annular cylindrical space is then defined by the geometry of the sidewalls. Generally, the mesh and second chamber may have cylindrical forms, such that in cross-section, the inner boundary of the annular cylindrical space is circular. The outer boundary of the annular cylindrical space is defined by the geometry of the sidewalls of the first chamber. The first chamber may be cylindrical (for example, having the form of a circular or elliptical cylinder), or may be a polygonal prism shape (for example, a rectangular or square prism shape). In cross-section, the outer boundary of the annular cylindrical space may be circular, elliptical, square, rectangular, or any other polygonal shape.

Optionally $H_2$ is less than ten times the mesh diameter, or less than five times the mesh diameter, or less than four times the mesh diameter, or less than three times the mesh diameter, or less than two times the mesh diameter.

Optionally $H_2$ is approximately equal to the mesh diameter, i.e. $H_2$ is approximately equal to d.

Such an arrangement (where the downstream face of the mesh is spaced from a wall partitioning the first chamber from the second chamber) seems to lead to improved separation efficiency.

A second aspect of the invention provides a separator for separating a multi-phase flow, the separator comprising: a first chamber at an upstream end of the separator, the first chamber comprising an inlet for an inlet flow to enter the first chamber; a second chamber at a downstream end of the separator, the second chamber comprising an outlet for a separated gas flow to exit the second chamber; a mesh located between the first chamber and the second chamber for separating phases of the multi-phase flow, wherein the mesh is configured to receive the multi-phase flow from the first chamber at an upstream face of the mesh, and is configured to allow the separated gas flow to flow into the second chamber from a downstream face of the mesh, wherein the second chamber at least partially projects into the first chamber by a distance $H_2$, wherein $H_2$ is related to a mesh diameter d of the mesh by the following relationship: $H_2>0.5$ d.

Here, (as described above) $H_2$ is the perpendicular distance between a plane defined by the downstream face of the mesh and a parallel plane defined by walls partitioning the first chamber from the second chamber, at the downstream end of the first chamber. These partitioning walls close off the first chamber at its downstream end.

By virtue of the second chamber projecting (at least partially) into the first chamber, the first chamber is notionally divided into two sections. The upstream section (upstream of the plane defined by the upstream face of the mesh) is generally an open space bounded by the upstream wall and sidewall(s) of the first chamber (as well as the inlet wall(s), in embodiments where the inlet projects into the first chamber). The downstream section is an annular space, defined between the side walls of the first chamber and the sidewalls of the second chamber projecting into the first chamber, and between the side walls of the first chamber and the sidewalls of the mesh. The form of this annular cylindrical space is then defined by the geometry of the sidewalls. Generally, the mesh and second chamber may have cylindrical forms, such that in cross-section, the inner boundary of the annular cylindrical space is circular. The outer boundary of the annular cylindrical space is defined by the geometry of the sidewalls of the first chamber. The first chamber may be cylindrical (for example, having the form of a circular or elliptical cylinder), or may be a polygonal prism shape (for example, a rectangular or square prism shape). In cross-section, the outer boundary of the annular cylindrical space may be circular, elliptical, square, rectangular, or any other polygonal shape.

Optionally $H_2$ is less than ten times the mesh diameter, or less than five times the mesh diameter, or less than four times the mesh diameter, or less than three times the mesh diameter, or less than two times the mesh diameter.

Optionally $H_2$ is approximately equal to the mesh diameter, i.e. $H_2$ is approximately equal to d.

Such an arrangement (where the downstream face of the mesh is spaced from a wall partitioning the first chamber from the second chamber) seems to lead to improved separation efficiency.

The upstream face of the mesh may be spaced apart from the inlet into the first chamber by a distance $H_1$, wherein $H_1$ is related to the mesh diameter d by the following relationship: $H_1>0.5$ d. The parameter $H_1$ is as described above in relation to the first aspect of the invention.

Optionally $H_1$ is less than ten times the mesh diameter, or less than five times the mesh diameter, or less than four times the mesh diameter, or less than three times the mesh diameter.

Optionally $H_1$ is approximately twice the mesh diameter, i.e. $H_1$ is approximately equal to 2d. This has been found to provide particularly efficient separation. When $H_1$ is increased to values greater than 2d, separation efficiency remains broadly the same, but the size of the separator increases. It is generally desirable for the separator to be as small as possible, whilst also providing the necessary level of separation efficiency. The necessary level of separation efficiency depends on the particular use of the separator.

The following optional features/advantages apply to both the preceding aspects of the invention (the first and second aspect), and may be combined with either aspect (optionally including any of the foregoing optional features).

The separator may be configured to separate different phases in the multi-phase flow received at the mesh, and in particular the separator may be configured to separate gas from liquid entrained in the gas. The liquid that is separated may include captured solid particles (for example, in a suspension), or may have captured a particular gas from the inlet flow.

As discussed in more detail below, the characteristics of the inlet flow (the flow received through the inlet into the first chamber) may be adjusted by the addition of liquid in the first chamber, in order to provide a multi-phase flow received at the mesh which can be separated as desired.

The multi-phase flow received by the mesh may comprise:

- Gas+liquid; or
- Gas+liquid+solid particles in the gas or entrained in the liquid droplets; or
- Gas+liquid+a particular gas from the inlet flow absorbed by the liquid; or
- Gas+liquid+a particular gas from the inlet flow absorbed by the liquid+solid particles in the gas or entrained in the liquid droplets.

That is, the multi-phase flow received by the mesh may comprise at least gas and liquid phases.

The inlet flow received by the first chamber through the inlet may comprise:

- Gas, i.e. a mixture of gases, in which case liquid may be added to the inlet flow in the first chamber to form a multi-phase flow to be received by the mesh, wherein the liquid may be configured to capture a first gas in the gas mixture, and the separator may thus be configured to separate the first gas from the remaining gases in the mixture of gases;
- Gas+liquid (in which case, liquid may not need to be added in the first chamber to achieve the desired separation, but in some cases additional liquid may be added);
- Gas+solid particles (in which case liquid may be added in the first chamber to achieve the desired separation);
- Gas+liquid+solid particles (in which case, liquid may not need to be added in the first chamber to achieve the desired separation, but in some cases additional liquid may be added).

An outer periphery of the mesh may be separated by a distance s from the sidewall(s) of the first chamber. Optionally, the distance s is less than two times the mesh diameter d, i.e. $s<2d$. Optionally, the distance s is less than or equal to the mesh diameter d, i.e. s d. Greater values of s are of course possible. However, increasing the distance s beyond the mesh diameter d may not significantly further enhance separation, and has the disadvantage of increasing the size of the separator.

Optionally, the distance s is greater than 0.1 times the mesh diameter d, i.e. $0.1d<s$ and for example, the distance s may be greater than or equal to approximately 0.25d, or 0.5d.

The mesh may have a thickness t (i.e. the perpendicular distance between the upstream face and downstream face of the mesh) of greater than 0 mm and less than about 3 times the mesh diameter, i.e. $0 \text{ mm}<t<3d$. The thickness t may be greater than 2 mm, greater than 5 mm, greater than 10 mm, or greater than 20 mm. The thickness t may be less than 2d, or less than 1 d. For example, the thickness t may be greater than 2 mm and less than the mesh diameter.

A mesh that is as thin as possible (i.e. thick enough to achieve the required separation, but no thicker) may be advantageous, in order to reduce the pressure drop caused by flow through the mesh. The suitable thickness of the mesh depends on the particular application of use of the separator.

The separator may comprise a motor for rotating the mesh. The motor may rotate an output shaft on which the mesh is provided. The motor and mesh may be placed in close proximity to minimise the length of the output shaft. Alternatively, the mesh may be provided on a second shaft, which may be coupled to the motor output shaft via a magnetic coupling. This gives a hermetic seal, which is particularly advantageous for applications where the multi-phase flow to be separated is at high pressure.

The separator may comprise a fan located downstream of the mesh. The fan may be configured to lower the pressure upstream of the fan and downstream of the mesh (i.e. between the mesh and the fan), and increase the pressure downstream of the fan. Operation of the fan has the effect of drawing the multi-phase flow into the mesh, and the separated gas flow out of the mesh. Operation of the fan compensates (at least partially) for pressure losses through the mesh.

The separator may comprise a motor. The motor may be arranged to drive rotation of both the mesh and the fan. The motor may be arranged between the fan and the mesh, or may be arranged on the opposite side of the fan from the mesh.

The fan may comprise 2 to 10 fan blades, for example 6 fan blades. The fan may be configured to act as an axial fan when rotated.

Optionally, the fan may be integrated into a mesh holder which supports the mesh. Therefore, the separator may comprise a mesh holder comprising a body portion extending between a first end and a second end, wherein the second end comprises a plurality of fan blades (for positioning downstream of the mesh) extending inwardly from the body portion. The plurality of fan blades may be configured such that the mesh holder operates as an axial fan when the mesh holder is rotated.

The mesh holder may comprise a central axle, with the fan blades extending from the body portion inwardly to the central axle. The body portion may be cylindrical in shape. An outer periphery of the body portion may form a sealing surface that contacts an inner wall of the second chamber.

The body portion may be open at the first end to receive the mesh. The body portion may overlap an outer periphery of the mesh at the first end, so that the mesh is inserted partially into the mesh holder.

An upstream edge of each fan blade may contact the downstream face of the mesh, or there may be some separation between the upstream edge of each fan blade and the downstream face of the mesh.

The body portion may comprise an inner lip for defining the extent to which the mesh can be inserted into the mesh holder. Optionally, the inner lip is slanted to drain away any liquid reaching the mesh perimeter at the inner lip towards a periphery of the mesh not covered by the body portion.

The mesh may be glued to the mesh holder. For example, the mesh and mesh holder may be glued together along the inner lip, and/or around the sides of the mesh holder which overlap the mesh, and/or where the central axis of the mesh holder abuts the downstream mesh face.

Alternatively, the mesh may be fitted within the mesh holder by a tight interference fit.

Alternatively or additionally to the use of glue/interference fit, a mechanical fastening may be used. For example, the mesh may comprise a through-hole coaxial with a central axis of the mesh, for receiving a central axle of the mesh holder. The mesh may then be secured to the mesh holder with a fastener which passes through the through-hole and fastens to the central axle (for example, by a screw-threaded connection). The fastener may comprise a wide end portion that is wider than the through-hole, which abuts a face of the mesh opposite the face received by the mesh holder.

However the mesh is attached to the mesh holder, it is advantageous that the attachment results in no, or minimal, blinding of the upstream face of the mesh to the multi-phase flow. Blinding of the mesh can lead to a reduction of the separation efficiency and increased pressure loss. Additionally, any fastening structures on the face of the mesh can provide surfaces on which contaminants can accumulate, which can also be detrimental to operation of the separator.

As set out above, the separator may comprise a motor for driving rotation of the mesh, and so also driving rotation of the mesh-holder fan. The central axle of the mesh holder may be integral with the motor's output shaft, or the central axle of the mesh holder may be rotated by the motor's output shaft via a magnetic coupling between the central axle and the output shaft.

The separator may comprise a nozzle (or a plurality of nozzles) configured to spray a liquid into the inlet flow or onto the mesh. The separator may comprise a reservoir for holding the liquid, wherein the nozzle is in fluid communication with the reservoir, and a pump for pumping the liquid from the reservoir to the nozzle. The liquid added may comprise one or more of: water, detergent, surfactant, alcohol, a chemical reactant or fire-suppressant. The particular liquid(s) can be chosen taking into consideration the particular use of the separator, the types of particles present in the multi-phase flow, and the likely problems that these pose. In general, any liquid can be added to achieve a desired result. The result may for example be cleaning the mesh, capturing solid particles, or creating new chemical solutions that are more easily caught by the separator.

Where a chemical reactant is added, the degree of reaction depends on the time of contact of the reactants. In this context, the separator can help to improve the mixing between the reactants, and then separate the products.

As an example of adding a chemical reactant, consider the case where it is desirable to remove $CO_2$ from an inlet flow comprising a mixture of gases. An amine solution can be added to the inlet flow, forming a multi-phase flow within the separator. The amine solution captures the $CO_2$ and then this solution can be separated out from the remaining gases in the mixture of gases.

The particular characteristics of the liquid addition (for example, the flow rate, droplet size produced by the nozzle(s), and the spray pattern (for example, flat fan, full cone, and mist)) can be chosen according to the particular characteristics of the inlet flow/multi-phase flow received by the separator.

The flow rate of the liquid may for example be 5-50 litre/min. For the highest separation efficiency, the flow rates of the liquid may be limited by the maximum separation capacity of the separator. In cases where high separation efficiency is not needed, more liquid can be introduced in order to achieve the desired results, at the cost of increased carry-over (liquid which is not separated from the flow passing out of the separator). Liquid can be added continuously, or intermittently.

Droplet sizes can vary from a diameter of 1 μm up to a continuous stream of liquid (such as from a tap). The droplet size may be chosen appropriately depending on the particular characteristics of the inlet flow/multi-phase flow received by the separator. For example, for separation of hydrocarbons (which have low surface tension) smaller droplets will be added compared to the case of separating water from air.

Consideration of the aperture of the nozzle may also be needed, for example to determine the number of nozzles needed to spray the full surface area of the mesh.

The additional liquid added into the separator can be drained away via the same drain system incorporated into the separator to drain off any non-gas phase separated out of the multi-phase flow. Drainage may be continuous, particularly in cases where additional liquid is added continuously to the multi-phase flow during operation of the separator. Alternatively, drainage may be intermittent.

There are three possible locations for the nozzle(s)—upstream of the mesh (within the first chamber), downstream of the mesh (within the second chamber) or at the mesh itself. A nozzle (or a plurality of nozzles) may be provided at all of these locations, at two different locations, or at one of the three locations.

A nozzle provided downstream of the mesh is suitable for spraying liquid onto the mesh when the separator is not in operation. The added liquid can be used to clean the mesh by removing any contaminants which have accumulated on the mesh, for example.

A nozzle provided upstream of the mesh is suitable for spraying liquid into the inlet flow or onto the mesh when the separator is operational or not operational. In particular, this can be done to capture and entrain small solid contaminants (or very viscous liquid droplets) within droplets of the added liquid, in order that those contaminants can be separated from the multi-phase flow. Additionally or alternatively, this can be done to absorb a particular gas within droplets of the added liquid, in order that this gas can be separated from the multi-phase flow. Because the nozzle is upstream of the mesh, liquid can be added during operation of the separator, and any added liquid is then separated from the gas-flow via the mesh, in the same way that liquid present in the inlet flow is separated from the gas-flow.

Liquid can also be added upstream to clean the mesh, and/or wet the mesh surface so that contaminants have difficulty sticking, thereby maintaining the mesh in a clean state, and/or suppress fire risk from accumulated contaminants.

For providing a nozzle at the mesh, the mesh may be mounted on a central axle, and the central axle may comprise a closed (blind) central bore. A nozzle (or plurality of nozzles) may run from the closed central bore out from the axle, the outlet of the nozzle being placed so as to be covered over by the mesh. A pipe may be configured to spray liquid up into the central bore, through the nozzle, and into the interior of the mesh. Such a configuration allows the mesh to be cleaned when the separator is not operating.

According to a third aspect of the invention, there is provided a method of separating a multi-phase flow comprising: flowing a multi-phase flow into an upstream face of a mesh provided in a first chamber of a separator, whereby a non-gas phase is forced radially out through interconnected pores in the mesh towards the periphery of the mesh, whilst a gas phase passes axially through the mesh, out of a downstream face of the mesh into a second chamber, wherein the upstream face of the mesh is spaced apart from an inlet into the first chamber by a distance $H_1$, wherein $H_1$ is related to the mesh diameter d by the following relationship: $H_1>0.5$ d.

According to a fourth aspect of the invention, there is provided a method of separating a multi-phase flow comprising: flowing a multi-phase flow into an upstream face of a mesh provided in a first chamber of a separator, whereby a non-gas phase is forced radially out through interconnected pores in the mesh towards the periphery of the mesh, whilst a gas phase passes axially through the mesh, out of a downstream face of the mesh into a second chamber, wherein the second chamber at least partially projects into the first chamber by a distance $H_2$, wherein $H_2$ is related to a diameter d of the mesh by the following relationship: $H_2>0.5$ d.

The foregoing methods may comprise the use of the separator of the first or second aspects of the invention, including any of the optional features thereof.

The following optional features apply to each of the third and fourth aspects of the invention.

The methods may comprise separating gas from liquid entrained in the gas, and/or may comprise separating gas from a suspension of solid particles in a liquid which is entrained in the gas, and/or may comprise separating gas absorbed by liquid from the remaining gases in the inlet flow.

The method may comprise rotating the mesh. The method may comprise rotating the mesh at 500 to 6,000 rpm, for example 3,000 to 5,000 rpm.

The method may comprise flowing a multi-phase flow through the separator at a rate of 100 $m^3$/hour-15,000 $m^3$/hour.

The method may comprise collecting the non-gas phase and draining off the collected non-gas phase.

The method may comprise spraying a liquid into the inlet flow (during operation), and/or onto the mesh (during operation, or when the separator is not operational). The liquid may comprise one or more of water, detergent, surfactant, alcohol, and fire-suppressant. Spraying liquid onto the mesh can clean the mesh (or maintain the mesh in a clean state). Spraying liquid into the inlet flow allows to entrain solid contaminant particles (or very viscous liquid droplets) and/or capture particular gases within the added liquid, so that these can be more readily separated from the inlet flow.

According to a fifth aspect of the invention, there is provided a separator for separating a multi-phase flow, the separator comprising: a first chamber at an upstream end of the separator, the first chamber comprising an inlet for an inlet flow to enter the first chamber; a second chamber at a downstream end of the separator, the second chamber comprising an outlet for a separated gas flow to exit the second chamber; a mesh located between the first chamber and the second chamber for separating phases of the multi-phase flow, wherein the mesh is configured to receive the multi-phase flow from the first chamber at an upstream face of the mesh, and is configured to allow the separated gas flow to flow into the second chamber from a downstream face of the mesh, wherein the mesh has a thickness t (i.e. the perpendicular distance between the upstream face and downstream face of the mesh) which is greater than 2 mm and/or less than two times a mesh diameter d.

Such an arrangement leads to improved separation efficiency.

The mesh may have a thickness t greater than 5 mm, greater than 10 mm, or greater than 20 mm. The mesh may have a thickness t less than the mesh diameter d. A mesh that is as thin as possible (i.e. thick enough to achieve the required separation, but no thicker) may be advantageous, in order to reduce the pressure drop caused by flow through the mesh.

Optionally, an outer periphery of the mesh is separated by a distance s from the sidewall(s) of the first chamber, wherein s is less than two times the mesh diameter and/or s is greater than 0.1 times the mesh diameter d.

Optionally, the distance s is less than or equal to the mesh diameter d, i.e. s d. Greater values of s are of course possible. However, increasing the distance s beyond the mesh diameter d may not significantly further enhance separation, and has the disadvantage of increasing the size of the separator. The distance s may be greater than or equal to approximately 0.25d, or 0.5d.

According to a sixth aspect of the invention, there is provided a separator for separating a multi-phase flow, the separator comprising: a first chamber at an upstream end of the separator, the first chamber comprising an inlet for an inlet flow to enter the first chamber; a second chamber at a downstream end of the separator, the second chamber comprising an outlet for a separated gas flow to exit the second chamber; a mesh located between the first chamber and the second chamber for separating phases of the multi-phase flow, wherein the mesh is configured to receive the multi-phase flow from the first chamber at an upstream face of the mesh, and is configured to allow the separated gas flow to flow into the second chamber from a downstream face of the mesh, wherein the an outer periphery of the mesh is separated by a distance s from the sidewall(s) of the first chamber, wherein s is less than two times the mesh diameter and/or s is greater than 0.1 times the mesh diameter d.

Such an arrangement leads to improved separation efficiency.

Optionally, the distance s is less than or equal to the mesh diameter d, i.e. s d. The distance s may be greater than or equal to 0.25d, or greater than or equal to 0.5d.

Optionally, the mesh has a thickness t which is greater than 2 mm and/or less than two times a mesh diameter d. The mesh may have a thickness t greater than 5 mm, greater than 10 mm, or greater than 20 mm. The mesh may have a thickness t less than the mesh diameter d. A mesh that is as thin as possible (i.e. thick enough to achieve the required separation, but no thicker) may be advantageous, in order to reduce the pressure drop caused by flow through the mesh.

The following optional features/advantages apply to both the preceding aspects of the invention (the fifth and sixth aspects), and may be combined with either aspect (optionally including any of the foregoing optional features).

Optionally, the upstream face of the mesh is spaced apart from the inlet into the first chamber by a distance $H_1$, wherein $H_1$ is related to the mesh diameter d by the following relationship: $H_1>0.5$ d.

The distance $H_1$ may be the perpendicular distance between two parallel planes, the first plane being the plane defined at an end of the inlet closest to the mesh, and the second plane being the plane defined by the upstream face of the mesh.

Such an arrangement (with the upstream face of the mesh spaced apart from the inlet into the first chamber by a distance $H_1$) leads to improved separation efficiency.

In some embodiments, the inlet projects into the first chamber, such that the first plane lies within the first chamber, offset from an upstream wall of the first chamber.

Optionally $H_1$ is less than ten times the mesh diameter, or less than five times the mesh diameter, or less than four times the mesh diameter, or less than three times the mesh diameter.

Optionally $H_1$ is approximately twice the mesh diameter, i.e. $H_1$ is approximately equal to 2d. This has been found to provide particularly efficient separation. When $H_1$ is increased to values greater than 2d, separation efficiency remains broadly the same, but the size of the separator increases. It is generally desirable for the separator to be as small as possible, whilst also providing the necessary level of separation efficiency. The necessary level of separation efficiency depends on the particular use of the separator.

Optionally, the second chamber at least partially projects into the first chamber by a distance $H_2$, wherein $H_2$ is related to a diameter d of the mesh by the following relationship: 0.5 $d<H_2$.

Here, $H_2$ is the perpendicular distance between a plane defined by the downstream face of the mesh and a parallel plane defined by walls partitioning the first chamber from the second chamber, at the downstream end of the first chamber. These partitioning walls close off the first chamber at its downstream end.

By virtue of the second chamber projecting (at least partially) into the first chamber, the first chamber is notionally divided into two sections. The upstream section (upstream of the plane defined by the upstream face of the mesh) is generally an open space bounded by the upstream wall and sidewall(s) of the first chamber (as well as the inlet wall(s), in embodiments where the inlet projects into the first chamber). The downstream section is an annular space, defined between the side walls of the first chamber and the sidewalls of the second chamber projecting into the first chamber, and between the side walls of the first chamber and the sidewalls of the mesh. The form of this annular cylindrical space is then defined by the geometry of the sidewalls. Generally, the mesh and second chamber may have cylindrical forms, such that in cross-section, the inner boundary of the annular cylindrical space is circular. The outer boundary of the annular cylindrical space is defined by the geometry of the sidewalls of the first chamber. The first chamber may be cylindrical (for example, having the form of a circular or elliptical cylinder), or may be a polygonal prism shape (for example, a rectangular or square prism shape). In cross-section, the outer boundary of the annular cylindrical space may be circular, elliptical, square, rectangular, or any other polygonal shape.

Optionally $H_2$ is less than ten times the mesh diameter, or less than five times the mesh diameter, or less than four times the mesh diameter, or less than three times the mesh diameter, or less than two times the mesh diameter.

Optionally $H_2$ is approximately equal to the mesh diameter, i.e. $H_2$ is approximately equal to d.

Such an arrangement (where the downstream face of the mesh is spaced from a wall partitioning the first chamber from the second chamber) seems to lead to improved separation efficiency.

The separator may be configured to separate different phases in the multi-phase flow received at the mesh, and in particular the separator may be configured to separate gas from liquid entrained in the gas. The liquid that is separated may include captured solid particles (for example, in a suspension), or may have captured a particular gas from the inlet flow.

As discussed in more detail below, the characteristics of the inlet flow (the flow received through the inlet into the first chamber) may be adjusted by the addition of liquid in the first chamber, in order to provide a multi-phase flow received at the mesh which can be separated as desired.

The multi-phase flow received by the mesh may comprise:

Gas+liquid; or

Gas+liquid+solid particles in the gas or entrained in the liquid droplets; or

Gas+liquid+a particular gas from the inlet flow absorbed by the liquid; or

Gas+liquid+a particular gas from the inlet flow absorbed by the liquid+solid particles in the gas or entrained in the liquid droplets.

That is, the multi-phase flow received by the mesh may comprise at least gas and liquid phases.

The inlet flow received by the first chamber through the inlet may comprise:

Gas, i.e. a mixture of gases, in which case liquid may be added to the inlet flow in the first chamber to form a multi-phase flow to be received by the mesh, wherein the liquid may be configured to capture a first gas in the gas mixture, and the separator may thus be configured to separate the first gas from the remaining gases in the mixture of gases;

Gas+liquid (in which case, liquid may not need to be added in the first chamber to achieve the desired separation, but in some cases additional liquid may be added);

Gas+solid particles (in which case liquid may be added in the first chamber to achieve the desired separation);

Gas+liquid+solid particles (in which case, liquid may not need to be added in the first chamber to achieve the desired separation, but in some cases additional liquid may be added).

The separator may comprise a motor for rotating the mesh. The motor may rotate an output shaft on which the mesh is provided. The motor and mesh may be placed in close proximity to minimise the length of the output shaft. Alternatively, the mesh may be provided on a second shaft, which may be coupled to the motor output shaft via a magnetic coupling. This gives a hermetic seal, which is particularly advantageous for applications where the multi-phase flow to be separated is at high pressure.

The separator may comprise a fan located downstream of the mesh. The fan may be configured to lower the pressure upstream of the fan and downstream of the mesh (i.e. between the mesh and the fan), and increase the pressure downstream of the fan. Operation of the fan has the effect of drawing the multi-phase flow into the mesh, and the separated gas flow out of the mesh. Operation of the fan compensates (at least partially) for pressure losses through the mesh.

The separator may comprise a motor. The motor may be arranged to drive rotation of both the mesh and the fan. The motor may be arranged between the fan and the mesh, or may be arranged on the opposite side of the fan from the mesh.

The fan may comprise 2 to 10 fan blades, for example 6 fan blades. The fan may be configured to act as an axial fan when rotated.

Optionally, the fan may be integrated into a mesh holder which supports the mesh. Therefore, the separator may comprise a mesh holder comprising a body portion extending between a first end and a second end, wherein the second end comprises a plurality of fan blades (for positioning downstream of the mesh) extending inwardly from the body portion. The plurality of fan blades may be configured such that the mesh holder operates as an axial fan when the mesh holder is rotated.

The mesh holder may comprise a central axle, with the fan blades extending from the body portion inwardly to the central axle. The body portion may be cylindrical in shape. An outer periphery of the body portion may form a sealing surface that contacts an inner wall of the second chamber.

The body portion may be open at the first end to receive the mesh. The body portion may overlap an outer periphery of the mesh at the first end, so that the mesh is inserted partially into the mesh holder.

An upstream edge of each fan blade may contact the downstream face of the mesh, or there may be some separation between the upstream edge of each fan blade and the downstream face of the mesh.

The body portion may comprise an inner lip for defining the extent to which the mesh can be inserted into the mesh holder.

Optionally, the inner lip is slanted to drain away any liquid reaching the mesh perimeter at the inner lip towards a periphery of the mesh not covered by the body portion.

The mesh may be glued to the mesh holder. For example, the mesh and mesh holder may be glued together along the inner lip, and/or around the sides of the mesh holder which overlap the mesh, and/or where the central axis of the mesh holder abuts the downstream mesh face.

Alternatively, the mesh may be fitted within the mesh holder by a tight interference fit.

Alternatively or additionally to the use of glue/interference fit, a mechanical fastening may be used. For example, the mesh may comprise a through-hole coaxial with a central axis of the mesh, for receiving a central axle of the mesh holder. The mesh may then be secured to the mesh holder with a fastener which passes through the through-hole and fastens to the central axle (for example, by a screw-threaded connection). The fastener may comprise a wide end portion that is wider than the through-hole, which abuts a face of the mesh opposite the face received by the mesh holder.

However the mesh is attached to the mesh holder, it is advantageous that the attachment results in no, or minimal, blinding of the upstream face of the mesh to the multi-phase flow. Blinding of the mesh can lead to a reduction of the separation efficiency and increased pressure loss. Additionally, any fastening structures on the face of the mesh can provide surfaces on which contaminants can accumulate, which can also be detrimental to operation of the separator.

As set out above, the separator may comprise a motor for driving rotation of the mesh, and so also driving rotation of the mesh-holder fan. The central axle of the mesh holder may be integral with the motor's output shaft, or the central axle of the mesh holder may be rotated by the motor's output shaft via a magnetic coupling between the central axle and the output shaft.

The separator may comprise a nozzle (or a plurality of nozzles) configured to spray a liquid into the inlet flow or onto the mesh. The separator may comprise a reservoir for holding the liquid, wherein the nozzle is in fluid communication with the reservoir, and a pump for pumping the liquid from the reservoir to the nozzle. The liquid added may comprise one or more of: water, detergent, surfactant, alcohol, a chemical reactant or fire-suppressant. The particular liquid(s) can be chosen taking into consideration the particular use of the separator, the types of particles present in the multi-phase flow, and the likely problems that these pose. In general, any liquid can be added to achieve a desired result. The result may for example be cleaning the mesh, capturing solid particles, or creating new chemical solutions that are more easily caught by the separator.

Where a chemical reactant is added, the degree of reaction depends on the time of contact of the reactants. In this context, the separator can help to improve the mixing between the reactants, and then separate the products.

As an example of adding a chemical reactant, consider the case where it is desirable to remove $CO_2$ from an inlet flow comprising a mixture of gases. An amine solution can be added to the inlet flow, forming a multi-phase flow within the separator. The amine solution captures the $CO_2$ and then this solution can be separated out from the remaining gases in the mixture of gases.

The particular characteristics of the liquid addition (for example, the flow rate, droplet size produced by the nozzle(s), and the spray pattern (for example, flat fan, full cone, and mist)) can be chosen according to the particular characteristics of the inlet flow/multi-phase flow received by the separator.

The flow rate of the liquid may for example be 5-50 litre/min. For the highest separation efficiency, the flow rates of the liquid may be limited by the maximum separation capacity of the separator. In cases where high separation efficiency is not needed, more liquid can be introduced in order to achieve the desired results, at the cost of increased carry-over (liquid which is not separated from the flow passing out of the separator). Liquid can be added continuously, or intermittently.

Droplet sizes can vary from a diameter of 1 μm up to a continuous stream of liquid (such as from a tap). The droplet size may be chosen appropriately depending on the particular characteristics of the inlet flow/multi-phase flow received by the separator. For example, for separation of hydrocarbons (which have low surface tension) smaller droplets will be added compared to the case of separating water from air.

Consideration of the aperture of the nozzle may also be needed, for example to determine the number of nozzles needed to spray the full surface area of the mesh.

The additional liquid added into the separator can be drained away via the same drain system incorporated into the separator to drain off any non-gas phase separated out of the multi-phase flow. Drainage may be continuous, particularly in cases where additional liquid is added continuously to the multi-phase flow during operation of the separator. Alternatively, drainage may be intermittent.

There are three possible locations for the nozzle(s)—upstream of the mesh (within the first chamber), downstream of the mesh (within the second chamber) or at the mesh itself. A nozzle (or a plurality of nozzles) may be provided at all of these locations, at two different locations, or at one of the three locations.

A nozzle provided downstream of the mesh is suitable for spraying liquid onto the mesh when the separator is not in operation. The added liquid can be used to clean the mesh by removing any contaminants which have accumulated on the mesh, for example.

A nozzle provided upstream of the mesh is suitable for spraying liquid into the inlet flow or onto the mesh when the separator is operational or not operational. In particular, this can be done to capture and entrain small solid contaminants (or very viscous liquid droplets) within droplets of the added liquid, in order that those contaminants can be separated from the multi-phase flow. Additionally or alternatively, this can be done to absorb a particular gas within droplets of the added liquid, in order that this gas can be separated from the multi-phase flow. Because the nozzle is upstream of the mesh, liquid can be added during operation of the separator, and any added liquid is then separated from the gas-flow via the mesh, in the same way that liquid present in the inlet flow is separated from the gas-flow.

Liquid can also be added upstream to clean the mesh, and/or wet the mesh surface so that contaminants have difficulty sticking, thereby maintaining the mesh in a clean state, and/or suppress fire risk from accumulated contaminants.

For providing a nozzle at the mesh, the mesh may be mounted on a central axle, and the central axle may comprise a closed (blind) central bore. A nozzle (or plurality of nozzles) may run from the closed central bore out from the axle, the outlet of the nozzle being placed so as to be covered over by the mesh. A pipe may be configured to spray liquid up into the central bore, through the nozzle, and into the interior of the mesh. Such a configuration allows the mesh to be cleaned when the separator is not operating.

According to a seventh aspect of the invention, there is provided a method of separating a multi-phase flow comprising: flowing a multi-phase flow into an upstream face of a mesh provided in a first chamber of a separator, whereby a non-gas phase is forced radially out through interconnected pores in the mesh towards the periphery of the mesh, whilst a gas phase passes axially through the mesh, out of a downstream face of the mesh into a second chamber, wherein the mesh has a thickness t which is greater than 2 mm and/or less than two times a mesh diameter d.

According to an eighth aspect of the invention, there is provided a method of separating a multi-phase flow comprising: flowing a multi-phase flow into an upstream face of a mesh provided in a first chamber of a separator, whereby a non-gas phase is forced radially out through interconnected pores in the mesh towards the periphery of the mesh, whilst a gas phase passes axially through the mesh, out of a downstream face of the mesh into a second chamber, wherein the an outer periphery of the mesh is separated by a distance s from the sidewall(s) of the first chamber, wherein s is less than two times the mesh diameter and/or s is greater than 0.1 times the mesh diameter d.

The foregoing methods may comprise the use of the separator of the fifth or sixth aspects of the invention, including any of the optional features thereof.

The following optional features apply to each of the seventh and eighth aspects of the invention.

The methods may comprise separating gas from liquid entrained in the gas, and/or may comprise separating gas from a suspension of solid particles in a liquid which is entrained in the gas, and/or may comprise separating gas absorbed by liquid from the remaining gases in the inlet flow.

The method may comprise rotating the mesh. The method may comprise rotating the mesh at 500 to 6,000 rpm, for example 3,000 to 5,000 rpm.

The method may comprise flowing a multi-phase flow through the separator at a rate of 100 $m^3$/hour-15,000 $m^3$/hour.

The method may comprise collecting the non-gas phase and draining off the collected non-gas phase.

The method may comprise spraying a liquid into the inlet flow (during operation), and/or onto the mesh (during operation, or when the separator is not operational). The liquid may comprise one or more of water, detergent, surfactant, alcohol, and fire-suppressant. Spraying liquid onto the mesh can clean the mesh (or maintain the mesh in a clean state). Spraying liquid into the inlet flow allows to entrain solid contaminant particles (or very viscous liquid droplets) and/or capture particular gases within the added liquid, so that these can be more readily separated from the inlet flow.

According to a ninth aspect of the invention, there is provided a mesh holder comprising a body portion extending between a first end and a second end, wherein the second end comprises a plurality of fan blades extending inwardly from the body portion, wherein the plurality of fan blades are configured such that the mesh holder operates as an axial fan when the mesh holder is rotated.

The plurality of fan blades are positioned such that they are downstream of the mesh, when a mesh is held by the mesh holder.

The mesh holder may comprise a central axle, with the fan blades extending from the body portion inwardly to the central axle. The fan may comprise 2 to 10 fan blades, for example 6 fan blades.

The body portion may be cylindrical in shape.

A mesh assembly may comprise a mesh holder of the ninth aspect (including any of the optional features described above) and a mesh (as discussed in greater detail below).

An upstream edge of each fan blade may contact the downstream face of the mesh, or there may be some separation between the upstream edge of each fan blade and the downstream face of the mesh.

The body portion may be open at the first end to receive the mesh. The body portion may overlap an outer periphery of the mesh at the first end, so that the mesh is inserted partially into the mesh holder.

The body portion may comprise an inner lip for defining the extent to which the mesh can be inserted into the mesh holder.

Optionally, the inner lip is slanted to drain away any liquid reaching the mesh perimeter at the inner lip towards a periphery of the mesh not covered by the body portion.

The mesh may be glued to the mesh holder. For example, the mesh and mesh holder may be glued together along the inner lip, and/or around the sides of the mesh holder which overlap the mesh, and/or where the central axis of the mesh holder abuts the downstream mesh face.

Alternatively, the mesh may be fitted within the mesh holder by a tight interference fit.

Alternatively or additionally to the use of glue/interference fit, a mechanical fastening may be used. For example, the mesh may comprise a through-hole coaxial with a central axis of the mesh, for receiving a central axle of the mesh holder. The mesh may then be secured to the mesh holder with a fastener which passes through the through-hole and fastens to the central axle (for example, by a screw-threaded connection). The fastener may comprise a wide end portion that is wider than the through-hole, which abuts a face of the mesh opposite the face received by the mesh holder.

However the mesh is attached to the mesh holder, it is advantageous that the attachment results in no, or minimal, blinding of the upstream face of the mesh to the multi-phase flow. Blinding of the mesh can lead to a reduction of the separation efficiency and increased pressure loss. Additionally, any fastening structures on the face of the mesh can provide surfaces on which contaminants can accumulate, which can also be detrimental to operation of the separator.

The invention extends to a separator for separating a multi-phase flow, the separator comprising: the foregoing mesh assembly and a motor for driving rotation of the mesh, and so also driving rotation of the mesh-holder fan.

The central axle of the mesh holder may be integral with the motor's output shaft, or the central axle of the mesh holder may be rotated by the motor's output shaft via a magnetic coupling between the central axle and the output shaft.

The separator may comprise a first chamber at an upstream end of the separator, the first chamber comprising an inlet for an inlet flow to enter the first chamber; a second chamber at a downstream end of the separator, the second chamber comprising an outlet for a separated gas flow to exit the second chamber; wherein the mesh assembly is located between the first chamber and the second chamber, the mesh being configured to receive the multi-phase flow from the first chamber at an upstream face of the mesh, and being configured to allow the separated gas flow to flow into the second chamber from a downstream face of the mesh.

Operation of the fan may compensate (at least partially) for pressure losses through the mesh.

Operation of the fan may have the effect of drawing the multi-phase flow into the mesh, and the separated gas flow out of the mesh.

Optionally, an outer periphery of the body portion forms a sealing surface that contacts an inner wall of the second chamber.

A tenth aspect of the invention provides a separator for separating a multi-phase flow, the separator comprising: a mesh which is configured to receive the multi-phase flow at an upstream face of the mesh, and is configured to allow a separated gas flow to flow out from a downstream face of the mesh; a fan located downstream of the mesh; and a motor, wherein the motor is arranged to drive rotation of both the mesh and the fan.

Operation of the fan has the effect of drawing the multi-phase flow into the mesh, and the separated gas flow out of the mesh. This compensates (at least partially) for pressure losses through the mesh.

The fan may comprise 2 to 10 fan blades, for example 6 fan blades. The fan may be configured to act as an axial fan when rotated.

The motor may be arranged between the fan and the mesh, or may be arranged on the opposite side of the fan from the mesh.

The fan may be located on the motor's output shaft. The fan may be located on a shaft driven by the motor's output shaft via a magnetic coupling between the shaft and the motor's output shaft.

The separator may comprise a first chamber at an upstream end of the separator, the first chamber comprising an inlet for an inlet flow to enter the first chamber; a second chamber at a downstream end of the separator, the second chamber comprising an outlet for a separated gas flow to exit the second chamber; wherein the mesh is located between the first chamber and the second chamber, the mesh being configured to receive the multi-phase flow from the first chamber at an upstream face of the mesh, and being configured to allow the separated gas flow to flow into the second chamber from a downstream face of the mesh.

The following optional features/advantages apply to both the preceding aspects of the invention (the ninth and tenth aspects), and may be combined with either aspect (optionally including any of the foregoing optional features).

Optionally, the upstream face of the mesh is spaced apart from the inlet into the first chamber by a distance $H_1$, wherein $H_1$ is related to the mesh diameter d by the following relationship: $H_1>0.5$ d.

The distance $H_1$ may be the perpendicular distance between two parallel planes, the first plane being the plane defined at an end of the inlet closest to the mesh, and the second plane being the plane defined by the upstream face of the mesh.

Such an arrangement (with the upstream face of the mesh spaced apart from the inlet into the first chamber by a distance $H_1$) leads to improved separation efficiency.

In some embodiments, the inlet projects into the first chamber, such that the first plane lies within the first chamber, offset from an upstream wall of the first chamber.

Optionally $H_1$ is less than ten times the mesh diameter, or less than five times the mesh diameter, or less than four times the mesh diameter, or less than three times the mesh diameter.

Optionally $H_1$ is approximately twice the mesh diameter, i.e. $H_1$ is approximately equal to 2d. This has been found to provide particularly efficient separation. When $H_1$ is increased to values greater than 2d, separation efficiency remains broadly the same, but the size of the separator increases. It is generally desirable for the separator to be as small as possible, whilst also providing the necessary level of separation efficiency. The necessary level of separation efficiency depends on the particular use of the separator.

Optionally, the second chamber at least partially projects into the first chamber by a distance $H_2$, wherein $H_2$ is related to a diameter d of the mesh by the following relationship: $0.5\,d<H_2$.

Here, $H_2$ is the perpendicular distance between a plane defined by the downstream face of the mesh and a parallel plane defined by walls partitioning the first chamber from the second chamber, at the downstream end of the first chamber. These partitioning walls close off the first chamber at its downstream end.

By virtue of the second chamber projecting (at least partially) into the first chamber, the first chamber is notionally divided into two sections. The upstream section (upstream of the plane defined by the upstream face of the mesh) is generally an open space bounded by the upstream wall and sidewall(s) of the first chamber (as well as the inlet wall(s), in embodiments where the inlet projects into the first chamber). The downstream section is an annular space, defined between the side walls of the first chamber and the sidewalls of the second chamber projecting into the first chamber, and between the side walls of the first chamber and the sidewalls of the mesh. The form of this annular cylindrical space is then defined by the geometry of the sidewalls. Generally, the mesh and second chamber may have cylindrical forms, such that in cross-section, the inner boundary of the annular cylindrical space is circular. The outer boundary of the annular cylindrical space is defined by the geometry of the sidewalls of the first chamber. The first chamber may be cylindrical (for example, having the form of a circular or elliptical cylinder), or may be a polygonal prism shape (for example, a rectangular or square prism shape). In cross-section, the outer boundary of the annular cylindrical space may be circular, elliptical, square, rectangular, or any other polygonal shape.

Optionally $H_2$ is less than ten times the mesh diameter, or less than five times the mesh diameter, or less than four times the mesh diameter, or less than three times the mesh diameter, or less than two times the mesh diameter.

Optionally $H_2$ is approximately equal to the mesh diameter, i.e. $H_2$ is approximately equal to d.

Such an arrangement (where the downstream face of the mesh is spaced from a wall partitioning the first chamber from the second chamber) seems to lead to improved separation efficiency.

The separator may be configured to separate different phases in the multi-phase flow received at the mesh, and in particular the separator may be configured to separate gas from liquid entrained in the gas. The liquid that is separated may include captured solid particles (for example, in a suspension), or may have captured a particular gas from the inlet flow.

As discussed in more detail below, the characteristics of the inlet flow (the flow received through the inlet into the first chamber) may be adjusted by the addition of liquid in the first chamber, in order to provide a multi-phase flow received at the mesh which can be separated as desired.

The multi-phase flow received by the mesh may comprise:

- Gas+liquid; or
- Gas+liquid+solid particles in the gas or entrained in the liquid droplets; or
- Gas+liquid+a particular gas from the inlet flow absorbed by the liquid; or
- Gas+liquid+a particular gas from the inlet flow absorbed by the liquid+solid particles in the gas or entrained in the liquid droplets.

That is, the multi-phase flow received by the mesh may comprise at least gas and liquid phases.

The inlet flow received by the first chamber through the inlet may comprise:

- Gas, i.e. a mixture of gases, in which case liquid may be added to the inlet flow in the first chamber to form a multi-phase flow to be received by the mesh, wherein the liquid may be configured to capture a first gas in the gas mixture, and the separator may thus be configured to separate the first gas from the remaining gases in the mixture of gases;
- Gas+liquid (in which case, liquid may not need to be added in the first chamber to achieve the desired separation, but in some cases additional liquid may be added);
- Gas+solid particles (in which case liquid may be added in the first chamber to achieve the desired separation);
- Gas+liquid+solid particles (in which case, liquid may not need to be added in the first chamber to achieve the desired separation, but in some cases additional liquid may be added).

An outer periphery of the mesh may be separated by a distance s from the sidewall(s) of the first chamber. Optionally, the distance s is less than two times the mesh diameter d, i.e. $s<2d$. Optionally, the distance s is less than or equal to the mesh diameter d, i.e. s d. Greater values of s are of course possible. However, increasing the distance s beyond the mesh diameter d may not significantly further enhance separation, and has the disadvantage of increasing the size of the separator.

Optionally, the distance s is greater than 0.1 times the mesh diameter d, i.e. $0.1d<s$ and for example, the distance s may be greater than or equal to approximately 0.25d, or 0.5d.

The mesh may have a thickness t (i.e. the perpendicular distance between the upstream face and downstream face of the mesh) of greater than 0 mm and less than about 3 times the mesh diameter, i.e. $0\text{ mm}<t<3d$. The thickness t may be greater than 2 mm, greater than 5 mm, greater than 10 mm, or greater than 20 mm. The thickness t may be less than 2d, or less than 1 d. For example, the thickness t may be greater than 2 mm and less than the mesh diameter.

A mesh that is as thin as possible (i.e. thick enough to achieve the required separation, but no thicker) may be advantageous, in order to reduce the pressure drop caused by flow through the mesh. The suitable thickness of the mesh depends on the particular application of use of the separator.

The separator may comprise a motor for rotating the mesh. The motor may rotate an output shaft on which the mesh is provided. The motor and mesh may be placed in close proximity to minimise the length of the output shaft. Alternatively, the mesh may be provided on a second shaft, which may be coupled to the motor output shaft via a magnetic coupling. This gives a hermetic seal, which is particularly advantageous for applications where the multi-phase flow to be separated is at high pressure.

The separator may comprise a nozzle (or a plurality of nozzles) configured to spray a liquid into the inlet flow or onto the mesh. The separator may comprise a reservoir for holding the liquid, wherein the nozzle is in fluid communication with the reservoir, and a pump for pumping the liquid from the reservoir to the nozzle. The liquid added may comprise one or more of: water, detergent, surfactant, alcohol, a chemical reactant or fire-suppressant. The particular liquid(s) can be chosen taking into consideration the particular use of the separator, the types of particles present in the multi-phase flow, and the likely problems that these pose. In general, any liquid can be added to achieve a desired result. The result may for example be cleaning the mesh, capturing solid particles, or creating new chemical solutions that are more easily caught by the separator.

Where a chemical reactant is added, the degree of reaction depends on the time of contact of the reactants. In this context, the separator can help to improve the mixing between the reactants, and then separate the products.

As an example of adding a chemical reactant, consider the case where it is desirable to remove $CO_2$ from an inlet flow comprising a mixture of gases. An amine solution can be added to the inlet flow, forming a multi-phase flow within the separator. The amine solution captures the $CO_2$ and then this solution can be separated out from the remaining gases in the mixture of gases.

The particular characteristics of the liquid addition (for example, the flow rate, droplet size produced by the nozzle(s), and the spray pattern (for example, flat fan, full cone, and mist)) can be chosen according to the particular characteristics of the inlet flow/multi-phase flow received by the separator.

The flow rate of the liquid may for example be 5-50 litre/min. For the highest separation efficiency, the flow rates of the liquid may be limited by the maximum separation capacity of the separator. In cases where high separation efficiency is not needed, more liquid can be introduced in order to achieve the desired results, at the cost of increased carry-over (liquid which is not separated from the flow passing out of the separator). Liquid can be added continuously, or intermittently.

Droplet sizes can vary from a diameter of 1 μm up to a continuous stream of liquid (such as from a tap). The droplet size may be chosen appropriately depending on the particular characteristics of the inlet flow/multi-phase flow received by the separator. For example, for separation of hydrocarbons (which have low surface tension) smaller droplets will be added compared to the case of separating water from air.

Consideration of the aperture of the nozzle may also be needed, for example to determine the number of nozzles needed to spray the full surface area of the mesh.

The additional liquid added into the separator can be drained away via the same drain system incorporated into the separator to drain off any non-gas phase separated out of the multi-phase flow. Drainage may be continuous, particularly in cases where additional liquid is added continuously to the multi-phase flow during operation of the separator. Alternatively, drainage may be intermittent.

There are three possible locations for the nozzle(s)—upstream of the mesh (within the first chamber), downstream of the mesh (within the second chamber) or at the mesh itself. A nozzle (or a plurality of nozzles) may be provided at all of these locations, at two different locations, or at one of the three locations.

A nozzle provided downstream of the mesh is suitable for spraying liquid onto the mesh when the separator is not in operation. The added liquid can be used to clean the mesh by removing any contaminants which have accumulated on the mesh, for example.

A nozzle provided upstream of the mesh is suitable for spraying liquid into the inlet flow or onto the mesh when the separator is operational or not operational. In particular, this can be done to capture and entrain small solid contaminants (or very viscous liquid droplets) within droplets of the added liquid, in order that those contaminants can be separated from the multi-phase flow. Additionally or alternatively, this can be done to absorb a particular gas within droplets of the added liquid, in order that this gas can be separated from the multi-phase flow. Because the nozzle is upstream of the mesh, liquid can be added during operation of the separator, and any added liquid is then separated from the gas-flow via the mesh, in the same way that liquid present in the inlet flow is separated from the gas-flow.

Liquid can also be added upstream to clean the mesh, and/or wet the mesh surface so that contaminants have difficulty sticking, thereby maintaining the mesh in a clean state, and/or suppress fire risk from accumulated contaminants.

For providing a nozzle at the mesh, the mesh may be mounted on a central axle, and the central axle may comprise a closed (blind) central bore. A nozzle (or plurality of nozzles) may run from the closed central bore out from the axle, the outlet of the nozzle being placed so as to be covered over by the mesh. A pipe may be configured to spray liquid up into the central bore, through the nozzle, and into the interior of the mesh. Such a configuration allows the mesh to be cleaned when the separator is not operating.

According to an eleventh aspect of the invention, there is provided a method of separating a multi-phase flow comprising: flowing a multi-phase flow into an upstream end of a rotating mesh, wherein the rotating mesh is held at its downstream end by a mesh holder which comprises a plurality of fan blades, wherein the mesh holder operates as an axial fan.

According to a twelfth aspect of the invention, there is provided a method of separating a multi-phase flow comprising: flowing a multi-phase flow into an upstream end of a rotating mesh and allowing a separated gas flow to flow out from a downstream face of the mesh, wherein rotation of the mesh is driven by a motor, and wherein the same motor is configured to drive rotation of a fan located downstream of the mesh. The fan may be an axial fan.

The foregoing methods may comprise the use of the mesh holder described above, the use of the mesh assembly described above, or the use of the separator as described above.

The following optional features apply to each of the eleventh and twelfth aspects of the invention.

The methods may comprise separating gas from liquid entrained in the gas, and/or may comprise separating gas from a suspension of solid particles in a liquid which is entrained in the gas, and/or may comprise separating gas absorbed by liquid from the remaining gases in the inlet flow.

The method may comprise rotating the mesh. The method may comprise rotating the mesh at 500 to 6,000 rpm, for example 3,000 to 5,000 rpm.

The method may comprise flowing a multi-phase flow through the separator at a rate of 100 $m^3$/hour-15,000 $m^3$/hour.

The method may comprise collecting the non-gas phase and draining off the collected non-gas phase.

The method may comprise spraying a liquid into the inlet flow (during operation), and/or onto the mesh (during operation, or when the separator is not operational). The liquid may comprise one or more of water, detergent, surfactant, alcohol, and fire-suppressant. Spraying liquid onto the mesh can clean the mesh (or maintain the mesh in a clean state). Spraying liquid into the inlet flow allows to entrain solid contaminant particles (or very viscous liquid droplets) and/or capture particular gases within the added liquid, so that these can be more readily separated from the inlet flow.

According to a thirteenth aspect, there is provided a separator for separating a multi-phase flow, the separator comprising: a mesh for separating phases of the multi-phase flow, wherein the mesh is configured to receive the multi-phase flow at an upstream face of the mesh, and is configured to allow a separated gas flow to flow out from a downstream face of the mesh; and a nozzle (or a plurality of nozzles) configured to spray a liquid into an inlet flow received by the separator and/or onto the mesh.

As discussed in more detail below, the characteristics of the inlet flow (the flow received through an inlet into the separator) may be adjusted by the addition of liquid, in order to provide a multi-phase flow received at the mesh which can be separated as desired.

The multi-phase flow received by the mesh may comprise:

Gas+liquid; or

Gas+liquid+solid particles in the gas or entrained in the liquid droplets; or

Gas+liquid+a particular gas from the inlet flow absorbed by the liquid; or

Gas+liquid+a particular gas from the inlet flow absorbed by the liquid+solid particles in the gas or entrained in the liquid droplets.

That is, the multi-phase flow received by the mesh may comprise at least gas and liquid phases.

The inlet flow received by the separator through the inlet may comprise:

Gas, i.e. a mixture of gases, in which case liquid may be added to the inlet flow in the separator to form a multi-phase flow to be received by the mesh, wherein the liquid may be configured to capture a first gas in the gas mixture, and the separator may thus be configured to separate the first gas from the remaining gases in the mixture of gases;

Gas+liquid (in which case, liquid may not need to be added in the separator to achieve the desired separation, but in some cases additional liquid may be added);

Gas+solid particles (in which case liquid may be added in the separator to achieve the desired separation);

Gas+liquid+solid particles (in which case, liquid may not need to be added in the separator to achieve the desired separation, but in some cases additional liquid may be added).

The separator may comprise a reservoir for holding the liquid, wherein the nozzle is in fluid communication with the reservoir, and a pump for pumping the liquid from the reservoir to the nozzle.

The liquid added may comprise one or more of: water, detergent, surfactant, alcohol, a chemical reactant or fire-suppressant. The particular liquid(s) can be chosen taking into consideration the particular use of the separator, the types of particles present in the multi-phase flow, and the likely problems that these pose. In general, any liquid can be added to achieve a desired result. The result may for example be cleaning the mesh, capturing solid particles, or creating new chemical solutions that are more easily caught by the separator.

Where a chemical reactant is added, the degree of reaction depends on the time of contact of the reactants. In this context, the separator can help to improve the mixing between the reactants, and then separate the products.

As an example of adding a chemical reactant, consider the case where it is desirable to remove $CO_2$ from an inlet flow comprising a mixture of gases. An amine solution can be added to the inlet flow, forming a multi-phase flow within the separator. The amine solution captures the $CO_2$ and then this solution can be separated out from the remaining gases in the mixture of gases.

The particular characteristics of the liquid addition (for example, the flow rate, droplet size produced by the nozzle(s), and the spray pattern (for example, flat fan, full cone, and mist)) can be chosen according to the particular characteristics of the inlet flow/multi-phase flow received by the separator.

The flow rate of the liquid may for example be 5-50 litre/min. For the highest separation efficiency, the flow rates of the liquid may be limited by the maximum separation capacity of the separator. In cases where high separation efficiency is not needed, more liquid can be introduced in order to achieve the desired results, at the cost of increased carry-over (liquid which is not separated from the flow passing out of the separator). Liquid can be added continuously, or intermittently.

Droplet sizes may vary from a diameter of 1 μm up to a continuous stream of liquid (such as from a tap). The droplet size may be chosen appropriately depending on the particular characteristics of the inlet flow/multi-phase flow received by the separator. For example, for separation of hydrocarbons (which have low surface tension) smaller droplets will be added compared to the case of separating water from air.

Consideration of the aperture of the nozzle may also be needed, for example to determine the number of nozzles needed to spray the full surface area of the mesh.

The additional liquid added into the separator can be drained away via the same drain system incorporated into the separator to drain off any non-gas phase separated out of the multi-phase flow (described below). Drainage may be continuous, particularly in cases where additional liquid is added continuously to the multi-phase flow during operation of the separator. Alternatively, drainage may be intermittent.

There are three possible locations for the nozzle(s)—upstream of the mesh (within the first chamber described below), downstream of the mesh (within the second chamber described below) or at the mesh itself. A nozzle (or a plurality of nozzles) may be provided at all of these locations, at two different locations, or at one of the three locations.

A nozzle provided downstream of the mesh is suitable for spraying liquid onto the mesh when the separator is not in operation. The added liquid can be used to clean the mesh by removing any contaminants which have accumulated on the mesh, for example.

A nozzle provided upstream of the mesh is suitable for spraying liquid into the inlet flow or onto the mesh when the separator is operational or not operational. In particular, this can be done to capture and entrain small solid contaminants (or very viscous liquid droplets) within droplets of the added liquid, in order that those contaminants can be separated from the multi-phase flow. Additionally or alternatively, this can be done to absorb a particular gas within droplets of the added liquid, in order that this gas can be separated from the multi-phase flow. Because the nozzle is upstream of the mesh, liquid can be added during operation of the separator, and any added liquid is then separated from the gas-flow via the mesh, in the same way that liquid present in the inlet flow is separated from the gas-flow.

Liquid can also be added upstream to clean the mesh, and/or wet the mesh surface so that contaminants have difficulty sticking, thereby maintaining the mesh in a clean state, and/or suppress fire risk from accumulated contaminants.

For providing a nozzle at the mesh, the mesh may be mounted on a central axle, and the central axle may comprise a closed (blind) central bore. A nozzle (or plurality of nozzles) may run from the closed central bore out from the axle, the outlet of the nozzle being placed so as to be covered over by the mesh. A pipe may be configured to spray liquid up into the central bore, through the nozzle, and into the interior of the mesh. Such a configuration allows the mesh to be cleaned when the separator is not operating.

The separator may comprise a first chamber at an upstream end of the separator, the first chamber at an upstream end of the separator comprising an inlet for the inlet flow to enter the first chamber; a second chamber at a downstream end of the separator, the second chamber comprising an outlet for a separated gas flow to exit the second chamber; wherein the mesh is located between the first chamber and the second chamber, the mesh being configured to receive the multi-phase flow from the first chamber at an upstream face of the mesh, and being configured to allow the separated gas flow to flow into the second chamber from a downstream face of the mesh.

Optionally, the upstream face of the mesh is spaced apart from the inlet into the first chamber by a distance $H_1$, wherein $H_1$ is related to the mesh diameter d by the following relationship: $H_1>0.5$ d.

The distance $H_1$ may be the perpendicular distance between two parallel planes, the first plane being the plane defined at an end of the inlet closest to the mesh, and the second plane being the plane defined by the upstream face of the mesh.

Such an arrangement (with the upstream face of the mesh spaced apart from the inlet into the first chamber by a distance $H_1$) leads to improved separation efficiency.

In some embodiments, the inlet projects into the first chamber, such that the first plane lies within the first chamber, offset from an upstream wall of the first chamber.

Optionally $H_1$ is less than ten times the mesh diameter, or less than five times the mesh diameter, or less than four times the mesh diameter, or less than three times the mesh diameter.

Optionally $H_1$ is approximately twice the mesh diameter, i.e. $H_1$ is approximately equal to 2d. This has been found to provide particularly efficient separation. When $H_1$ is increased to values greater than 2d, separation efficiency remains broadly the same, but the size of the separator increases. It is generally desirable for the separator to be as small as possible, whilst also providing the necessary level of separation efficiency. The necessary level of separation efficiency depends on the particular use of the separator.

Optionally, the second chamber at least partially projects into the first chamber by a distance $H_2$, wherein $H_2$ is related to a diameter d of the mesh by the following relationship: 0.5 d<$H_2$.

Here, $H_2$ is the perpendicular distance between a plane defined by the downstream face of the mesh and a parallel plane defined by walls partitioning the first chamber from the second chamber, at the downstream end of the first chamber. These partitioning walls close off the first chamber at its downstream end.

By virtue of the second chamber projecting (at least partially) into the first chamber, the first chamber is notionally divided into two sections. The upstream section (upstream of the plane defined by the upstream face of the mesh) is generally an open space bounded by the upstream wall and sidewall(s) of the first chamber (as well as the inlet wall(s), in embodiments where the inlet projects into the first chamber). The downstream section is an annular space, defined between the side walls of the first chamber and the sidewalls of the second chamber projecting into the first chamber, and between the side walls of the first chamber and the sidewalls of the mesh. The form of this annular cylindrical space is then defined by the geometry of the sidewalls. Generally, the mesh and second chamber may have cylindrical forms, such that in cross-section, the inner boundary of the annular cylindrical space is circular. The outer boundary of the annular cylindrical space is defined by the geometry of the sidewalls of the first chamber. The first chamber may be cylindrical (for example, having the form of a circular or elliptical cylinder), or may be a polygonal prism shape (for example, a rectangular or square prism shape). In cross-section, the outer boundary of the annular cylindrical space may be circular, elliptical, square, rectangular, or any other polygonal shape.

Optionally $H_2$ is less than ten times the mesh diameter, or less than five times the mesh diameter, or less than four times the mesh diameter, or less than three times the mesh diameter, or less than two times the mesh diameter.

Optionally $H_2$ is approximately equal to the mesh diameter, i.e. $H_2$ is approximately equal to d.

Such an arrangement (where the downstream face of the mesh is spaced from a wall partitioning the first chamber from the second chamber) seems to lead to improved separation efficiency.

The separator may be configured to separate different phases in the multi-phase flow received at the mesh, and in particular the separator may be configured to separate gas from liquid entrained in the gas. The liquid that is separated may include captured solid particles (for example, in a suspension), or may have captured a particular gas from the inlet flow.

An outer periphery of the mesh may be separated by a distance s from the sidewall(s) of the first chamber. Optionally, the distance s is less than two times the mesh diameter d, i.e. s<2d. Optionally, the distance s is less than or equal to the mesh diameter d, i.e. s d. Greater values of s are of course possible. However, increasing the distance s beyond the mesh diameter d may not significantly further enhance separation, and has the disadvantage of increasing the size of the separator.

Optionally, the distance s is greater than 0.1 times the mesh diameter d, i.e. $\mathbf{0.1}d<s$ and for example, the distance s may be greater than or equal to approximately 0.25d, or 0.5d.

The mesh may have a thickness t (i.e. the perpendicular distance between the upstream face and downstream face of the mesh) of greater than 0 mm and less than about 3 times the mesh diameter, i.e. 0 mm<t<3d. The thickness t may be greater than 2 mm, greater than 5 mm, greater than 10 mm, or greater than 20 mm. The thickness t may be less than 2d, or less than 1 d. For example, the thickness t may be greater than 2 mm and less than the mesh diameter.

A mesh that is as thin as possible (i.e. thick enough to achieve the required separation, but no thicker) may be advantageous, in order to reduce the pressure drop caused by flow through the mesh. The suitable thickness of the mesh depends on the particular application of use of the separator.

The separator may comprise a motor for rotating the mesh. The motor may rotate an output shaft on which the mesh is provided. The motor and mesh may be placed in close proximity to minimise the length of the output shaft. Alternatively, the mesh may be provided on a second shaft, which may be coupled to the motor output shaft via a magnetic coupling. This gives a hermetic seal, which is particularly advantageous for applications where the multi-phase flow to be separated is at high pressure.

The separator may comprise a fan located downstream of the mesh. The fan may be configured to lower the pressure upstream of the fan and downstream of the mesh (i.e. between the mesh and the fan), and increase the pressure downstream of the fan. Operation of the fan has the effect of drawing the multi-phase flow into the mesh, and the separated gas flow out of the mesh. Operation of the fan compensates (at least partially) for pressure losses through the mesh.

The separator may comprise a motor. The motor may be arranged to drive rotation of both the mesh and the fan. The motor may be arranged between the fan and the mesh, or may be arranged on the opposite side of the fan from the mesh.

The fan may comprise 2 to 10 fan blades, for example 6 fan blades. The fan may be configured to act as an axial fan when rotated.

Optionally, the fan may be integrated into a mesh holder which supports the mesh. Therefore, the separator may comprise a mesh holder comprising a body portion extending between a first end and a second end, wherein the second end comprises a plurality of fan blades (for positioning downstream of the mesh) extending inwardly from the body portion. The plurality of fan blades may be configured such that the mesh holder operates as an axial fan when the mesh holder is rotated.

The mesh holder may comprise a central axle, with the fan blades extending from the body portion inwardly to the central axle. The body portion may be cylindrical in shape. An outer periphery of the body portion may form a sealing surface that contacts an inner wall of the second chamber.

The body portion may be open at the first end to receive the mesh. The body portion may overlap an outer periphery of the mesh at the first end, so that the mesh is inserted partially into the mesh holder.

An upstream edge of each fan blade may contact the downstream face of the mesh, or there may be some separation between the upstream edge of each fan blade and the downstream face of the mesh.

The body portion may comprise an inner lip for defining the extent to which the mesh can be inserted into the mesh holder.

Optionally, the inner lip is slanted to drain away any liquid reaching the mesh perimeter at the inner lip towards a periphery of the mesh not covered by the body portion.

The mesh may be glued to the mesh holder. For example, the mesh and mesh holder may be glued together along the inner lip, and/or around the sides of the mesh holder which overlap the mesh, and/or where the central axis of the mesh holder abuts the downstream mesh face.

Alternatively, the mesh may be fitted within the mesh holder by a tight interference fit.

Alternatively or additionally to the use of glue/interference fit, a mechanical fastening may be used. For example, the mesh may comprise a through-hole coaxial with a central axis of the mesh, for receiving a central axle of the mesh holder. The mesh may then be secured to the mesh holder with a fastener which passes through the through-hole and fastens to the central axle (for example, by a screw-threaded connection). The fastener may comprise a wide end portion that is wider than the through-hole, which abuts a face of the mesh opposite the face received by the mesh holder.

However the mesh is attached to the mesh holder, it is advantageous that the attachment results in no, or minimal, blinding of the upstream face of the mesh to the multi-phase flow. Blinding of the mesh can lead to a reduction of the separation efficiency and increased pressure loss. Additionally, any fastening structures on the face of the mesh can provide surfaces on which contaminants can accumulate, which can also be detrimental to operation of the separator.

As set out above, the separator may comprise a motor for driving rotation of the mesh, and so also driving rotation of the mesh-holder fan. The central axle of the mesh holder may be integral with the motor's output shaft, or the central axle of the mesh holder may be rotated by the motor's output shaft via a magnetic coupling between the central axle and the output shaft.

According to a fourteenth aspect of the invention, there is provided a method of separating a multi-phase flow using a mesh comprising: receiving an inlet flow; spraying a liquid into the inlet flow, or onto the mesh; flowing the multi-phase flow into an upstream face of the mesh and allowing a separated gas flow to flow out from a downstream face of the mesh.

The characteristics of the inlet flow (the flow received through an inlet into the separator) may be adjusted by the addition of liquid, in order to provide a multi-phase flow received at the mesh which can be separated as desired.

The multi-phase flow received by the mesh may comprise:

- Gas+liquid; or
- Gas+liquid+solid particles in the gas or entrained in the liquid droplets; or
- Gas+liquid+a particular gas from the inlet flow absorbed by the liquid; or
- Gas+liquid+a particular gas from the inlet flow absorbed by the liquid+solid particles in the gas or entrained in the liquid droplets.

That is, the multi-phase flow received by the mesh may comprise at least gas and liquid phases.

The inlet flow received by the separator through the inlet may comprise:

- Gas, i.e. a mixture of gases, in which case liquid may be added to the inlet flow in the separator to form a multi-phase flow to be received by the mesh, wherein the liquid may be configured to capture a first gas in the gas mixture, and the separator may thus be configured to separate the first gas from the remaining gases in the mixture of gases;
- Gas+liquid (in which case, liquid may not need to be added in the separator to achieve the desired separation, but in some cases additional liquid may be added);
- Gas+solid particles (in which case liquid may be added in the separator to achieve the desired separation);
- Gas+liquid+solid particles (in which case, liquid may not need to be added in the separator to achieve the desired separation, but in some cases additional liquid may be added).

The particular characteristics of the liquid addition (for example, the flow rate, droplet size produced by the nozzle(s), and the spray pattern (for example, flat fan, full cone, and mist)) can be chosen according to the particular characteristics of the inlet flow/multi-phase flow received by the separator.

The flow rate of the liquid may for example be 5-50 litre/min. For the highest separation efficiency, the flow rates of the liquid may be limited by the maximum separation capacity of the separator. In cases where high separation efficiency is not needed, more liquid can be introduced in order to achieve the desired results, at the cost of increased carry-over (liquid which is not separated from the flow passing out of the separator). Liquid can be added continuously, or intermittently.

Droplet sizes may vary from a diameter of 1 μm up to a continuous stream of liquid (such as from a tap). The droplet size may be chosen appropriately depending on the particular characteristics of the inlet flow/multi-phase flow received by the separator. For example, for separation of hydrocarbons (which have low surface tension) smaller droplets will be added compared to the case of separating water from air.

A nozzle provided downstream of the mesh is suitable for spraying liquid onto the mesh when the separator is not in operation. The added liquid can be used to clean the mesh by removing any contaminants which have accumulated on the mesh, for example.

Spraying liquid into the inlet flow or onto the mesh when the separator is operational or not operational can be done to capture and entrain small solid contaminants (or very viscous liquid droplets) within droplets of the added liquid, in order that those contaminants can be separated from the multi-phase flow. Additionally or alternatively, this can be done to absorb a particular gas within droplets of the added liquid, in order that this gas can be separated from the multi-phase flow. By adding liquid upstream of the mesh during operation of the separator, any added liquid is then separated from the gas-flow via the mesh, in the same way that liquid present in the inlet flow is separated from the gas-flow.

Liquid can also be added upstream to clean the mesh, and/or wet the mesh surface so that contaminants have difficulty sticking, thereby maintaining the mesh in a clean state, and/or suppress fire risk from accumulated contaminants.

The foregoing method may comprise the use of the separator of the thirteenth aspect of the invention, optionally including any of the optional features thereof.

The method may comprise separating gas from liquid entrained in the gas, and/or may comprise separating gas from a suspension of solid particles in a liquid which is entrained in the gas, and/or may comprise separating gas absorbed by liquid from the remaining gases in the inlet flow.

The method may comprise rotating the mesh. The method may comprise rotating the mesh at 500 to 6,000 rpm, for example 3,000 to 5,000 rpm.

The method may comprise flowing a multi-phase flow through the separator at a rate of 100 $m^3$/hour-15,000 $m^3$/hour.

The method may comprise collecting the non-gas phase and draining off the collected non-gas phase (including the added liquid).

The liquid may comprise one or more of water, detergent, surfactant, alcohol, a chemical reactant, and fire-suppressant. Spraying liquid onto the mesh can clean the mesh (or maintain the mesh in a clean state). Spraying liquid into the inlet flow allows to entrain solid contaminant particles (or very viscous liquid droplets) and/or capture particular gases within the added liquid, so that these can be more readily separated from the inlet flow.

The following optional features/advantages apply to any of the preceding aspects of the invention relating to an apparatus (the first, second, fifth, sixth, ninth, tenth, and thirteenth aspects), and may be combined with any of those aspects (optionally including any of the foregoing optional features). The further apparatus features described below may also be used in any of the aspects of the invention relating to a method (the third, fourth, seventh, eighth, eleventh, twelfth, and fourteenth aspects), optionally including any of the foregoing optional method features.

Optionally, the mesh is rotatable and during operation of the separator, the mesh preferably rotates. Then, the multi-phase flow (comprising for example gas and entrained liquid droplets) passes through the first chamber and into the rotating mesh. As the multi-phase flow passes through the rotating mesh, the liquid is centrifuged and coalesces within the pores of the mesh. The flow of coalesced liquid is forced radially outwards towards the outer periphery of the mesh by the centrifugal force generated as a result of the rotation of the mesh. The flow of coalesced liquid is then spun across the gap between the outer periphery of the mesh and the wall of the first chamber, and collects on the wall of the first chamber. The flow of coalesced liquid is then drained from the wall of the first chamber. Meanwhile the separated gas (depleted of the liquid phase) passes through the mesh into the second chamber.

Even when the mesh is not rotating, the separating efficiency is comparable to or higher than a standard wire mesh separator, because the liquid cannot flood the mesh. In a standard wire mesh separator, the liquid can only go either up or down. In the mesh described herein, liquid also has the option of going to the sides (i.e. radially outwards towards the outer periphery of the mesh). In a non-rotating state, this movement is not driven by centrifugal forces as described above. Rather, the liquid is pushed via the upcoming gas flow and travels radially outward, along the path of least resistance. Therefore, in some embodiments, the mesh may be fixed in position such that it is configured to remain stationary (non-rotating). In other embodiments in which the mesh is rotatable, even in the event of a failure which results in the mesh being stationary (non-rotating) the separator may still provide some separating functionality.

Flow of the multi-phase flow and separated gas through the separator may be in a generally axial direction. An axis of the inlet may be generally aligned with an axis (for example, a central axis) of the separator (defined by the axis of rotation of the mesh). The multi-phase flow may flow through the first chamber to the mesh in a generally axial direction. Flow through the mesh may also be generally axial, with separated gas (depleted of non-gas phases) passing through the mesh in a generally axial direction. Flow of separated gas out of the mesh and through the second chamber may be broadly axial, at least for the portion of the second chamber which projects into the first chamber. Flow out of the second chamber out of the outlet may be axial, or may be in a direction other than the axial direction.

In general, the flow-rate through the separator will be dependent on the diameter of the mesh and the required efficiency of the separator, both of which may in turn depend upon the particular usage of the separator. For example, a small-diameter separator installed in a kitchen to separate fatty droplets from air will handle a much smaller flow-rate than a larger-diameter separator installed in a ship's exhaust system.

The separator may operate with a flow rate of 50 $m^3$/hour-30,000 $m^3$/hour, depending on the diameter of the mesh and the required efficiency of the separator.

As an example, a separator with a mesh diameter of 375 mm may be able to handle a multi-phase flow of 5,000 $m^3$/hour-15,000 $m^3$/hour. Much lower flow rates are of course also possible.

The separator may comprise a seal around the outer downstream periphery of the mesh, for preventing flow from the first chamber into the second chamber, except through the mesh. The seal may be a labyrinth seal. The seal may instead be a contact seal, or any other sealing solution.

The first chamber may have a diameter D. Then, the ratio of the diameter d of the mesh to the diameter D of the first chamber may be in the range of 0.5 to 0.7, and is optionally approximately 0.6.

The diameter d of the mesh is not limited, and may be chosen according to the particular use of the separator. The diameter d of the mesh may for example be between 5 mm and 750 mm.

The diameter D of the first chamber is likewise not limited, and is chosen to appropriately house a suitably-sized mesh.

The separator may be arranged vertically, with the first chamber arranged vertically below the second chamber. Flow through the separator then broadly follows the upwards vertical direction.

In a vertically-arranged separator, liquid separated from the multi-phase flow may be collected on the sidewall(s) of the first chamber during operation of the separator. The liquid then flows down the sidewall(s) under gravity, to collect in a collection reservoir at the base of the first chamber.

Therefore, the separator may comprise a collection reservoir at the bottom of the first chamber. The collection reservoir may comprise a drain for draining off liquids and/or solids collected in the collection reservoir. The drain may comprise a valve for controlling flow out of the drain.

The inlet to the separator may comprise a vertically oriented pipe which protrudes vertically upwards into the first chamber in the direction towards the mesh. The distance $H_1$ is measured from the uppermost end of the inlet pipe (i.e. the end of the inlet pipe closest to the mesh). The collection reservoir may comprise an annular space at the bottom of the first chamber with an outer wall defined by the sidewall(s) of the first chamber, and an inner wall defined by the inlet pipe. The volume of the collection reservoir then depends on the height of the inlet pipe, and the relative diameters of the first chamber and inlet pipe.

The separator may alternatively be arranged horizontally, with appropriate re-structuring of the liquid collection mechanism to include a drain in the lowermost part of the first chamber.

In general, the separator can be oriented horizontally, vertically, or at any angle in between, as long as it is possible to drain the separated non-gas phase out of the separator.

The separator may also be operated in an inverted configuration with flow through the separator then broadly following the downwards vertical direction. In such a case, the collection reservoir may then be at the downstream end of the first chamber, defined by the sidewall(s) of the first chamber, the walls partitioning the first chamber from the second chamber, and a wall or walls surrounding the mesh. The collection reservoir may comprise a drain for draining off liquids and/or solids collected in the collection reservoir. The drain may comprise a valve for controlling flow out of the drain.

The separator can be oriented in this inverted vertical orientation, or at any angle in between the inverted vertical orientation and the horizontal.

The mesh generally has a circular cross-section transverse to its axis, such that the mesh possesses circular symmetry abound its axis (also called cylindrical symmetry or axial symmetry). In some embodiments, the mesh may be cylindrical (for example, a right circular cylinder). However, the mesh is not limited to such a configuration. For example, the mesh may have a conical shape (including a truncated-conical shape). The mesh may broadly be shaped like a cylinder, but may have a convex or concave surface at either end (or any other non-flat surface), instead of flat circular faces.

In embodiments where the diameter of the mesh varies along its axis, the "diameter" referred to in the statements of invention and optional features described herein is the maximum diameter.

The mesh may comprise a porous structure, for example a foam structure. The material of the porous structure is not limited, but the choice of material may depend on the fluids to be separated—for example, a material which does not chemically react with the fluids to be separated should be chosen. Optionally, the porous structure may comprise a hydrophobic or hydrophilic material. The material properties may be chosen taking into consideration the fluids to be separated. Optionally, the porous structure may comprise a catalytic material.

The porous structure may include any coating and/or surface treatment which changes the surface properties to give desired characteristics (e.g. hydrophobicity, hydrophilicity, smoothness etc.). The coating may for example be a polymer coat. The porous structure may comprise an inert coating, for example an anodized coating. The porous structure may comprise a catalytic coating.

The material of the mesh may be chosen taking into consideration the types of liquid (for example, water or oil) to be separated from the gas flow. The chosen material should avoid corrosion and have good wettability for the liquid to be separated.

The mesh may comprise a porous metal structure. The metal may for example be aluminium, steel (for example, stainless steel), titanium, copper or nickel.

The mesh may comprise a porous polymer or plastic structure. The polymer or plastic may be any polymer or plastic capable of forming a structure strong enough to withstand the rotational forces applied during separation, and with material properties suited to the environment (for example, temperature and flow rate) during separation.

The mesh may comprise a porous composite material structure. The composite material may comprise any composite material capable of forming a structure strong enough to withstand the rotational forces applied during separation, and with material properties suited to the environment (for example, temperature and flow rate) during separation.

The mesh may comprise an open-cell structure. This means that the pores of the mesh form an interconnected network, allowing passage of the multi-phase flow through the mesh.

The mesh may comprise a self-supporting structure. Alternatively, the mesh may be non-self-supporting, requiring an additional support element.

The mesh is advantageously as open as possible (whilst still achieving the necessary degree of separation) to avoid a high pressure drop across the mesh.

The mesh may comprise a random cell structure. This means that the pores do not have a predetermined size or distribution. Any fabrication method known in the art suitable for producing a mesh with a random cell structure may be used.

Alternatively, the mesh may comprise a regular cell structure. This means that the pores have a predetermined size and distribution. Any fabrication method known in the art suitable for producing a mesh with regular cell structure (for example, 3D printing) may be used.

The mesh may have a porosity of 75% to 95%, for example 90%. The porosity may be chosen according to the particular operating parameters of the separator.

The mesh may have an average pore diameter of 0.25 mm to 25 mm, for example approximately 0.63 mm, 1.25 mm, 2.5 mm, 5 mm. The mesh may have an average pore diameter of between 0.63 mm and 5 mm.

The average pore diameter may be chosen depending on the particular application of use of the mesh. For example, separation under high pressure may require use of smaller pores than separation under ambient pressure.

The mesh may have a pore density of between 1 ppi (pores per inch) and 100 ppi, for example approximately 5 ppi, approximately 10 ppi, approximately 20 ppi, approximately 40 ppi.

The speed of rotation of the mesh may be chosen depending on the particular usage and required efficiency of the separator. For example, the mesh may be configured to rotate at 500 to 6,000 rpm (revolutions per minute), for example less than 5,000 rpm.

The separator may be a pressure vessel, allowing separation of a multi-phase flow under pressure (i.e. pressurized to a pressure greater than atmospheric pressure) or under reduced pressure (i.e. at a pressure lower than atmospheric pressure). The separator may also operate under ambient pressure conditions (in which case the separator need not be a pressure vessel). The working pressure may depend on the multi-phase flow and the fluids to be separated. For example, hydrocarbons are normally separated at high working pressures, whereas separation of water from air is normally carried out at atmospheric pressure.

The invention also extends to a separator system comprising a plurality of the separators according to the preceding aspects of the invention, including any of the optional features thereof. The plurality of separators may be arranged in parallel or in series.

The separator disclosed herein may be used in a number of different applications. Some of these are discussed below.

Separation of Hydrocarbons

In the petrochemical industry, separation of liquid hydrocarbons from gaseous hydrocarbons is often necessary. The separator disclosed herein is suitable for such use. The invention therefore extends to a method of separating liquid hydrocarbons from gaseous hydrocarbons, comprising the method of the third, fourth, seventh, eighth, eleventh, twelfth, or fourteenth aspect of the invention (optionally including any of the optional features set out above).

Amine Scrubbing

Amine scrubbing processes use aqueous solutions of alkylamines (commonly referred to simply as amines) to remove hydrogen sulfide ($H_2S$) and/or carbon dioxide ($CO_2$) from gases. Such processes are often used in refineries, petrochemical plants, natural gas processing plants etc. The separator disclosed herein is suitable for such use. The invention therefore extends to a method of removing a first gas from an inlet gas flow comprising a mixture of gases. The method comprises the method of the third, fourth, seventh, eighth, eleventh, twelfth, or fourteenth aspect of the invention (optionally including any of the optional features set out). The method may also comprise adding a chemical reactant in liquid form (for example, an aqueous amine solution) to absorb the first gas.

Cleaning of Intake Gas for Compressors

Intake gas for use by compressors may not always be clean. In particular, it may include liquids and solid particles. Over time, these may cause damage to the internal components of the compressor. Existing solutions are very large and hence not practical for many situations.

Installing a separator as disclosed herein prior to the compressor intake can largely eliminate such contaminants from the intake gas, and adds only a relatively small additional component to the existing system.

The invention therefore extends to a compressor system comprising a compressor which receives intake gas, and the separator of the first, second, fifth, sixth, ninth, tenth, or thirteenth aspect of the invention (optionally including any of the optional features set out above). The separator is configured to reduce or eliminate contaminants from intake gas for the compressor.

The invention also extends to a method of reducing or eliminating contaminants from intake gas for a compressor, comprising the method of the third, fourth, seventh, eighth, eleventh, twelfth, or fourteenth of the invention (optionally including any of the optional features set out above).

Removal of Liquid for the Feed Gas Used for Dry Gas Seals

Dry gas seals are non-contacting, dry-running face seals, mainly used in high-speed applications. In general, they may consist of a mating (rotating) ring and a primary (stationary) ring, with a very small gap separating the rotary and stationary faces. The rotary face has shallow, often spiral, grooves, which "catch" gas to maintain a minute gap.

Dry gas seals are typically used in harsh working environments such as oil exploration, extraction and refining, petrochemical industries, gas transmission and chemical processing. Dry gas seals are often used in centrifugal compressors because they eliminate contamination and do not use lubricating oil.

For the dry gas seals to operate correctly and safely, the feed gas must be very dry. Installing a separator as disclosed herein to process the feed gas prior to feeding it to the dry gas seals can largely eliminate contaminants from the feed gas.

The invention therefore extends to a dry gas seal system comprising a dry gas seal configured to receive intake gas through a gas intake, and the separator of the first, second, fifth, sixth, ninth, tenth, or thirteenth aspect of the invention (optionally including any of the optional features set out above). The separator is configured to reduce or eliminate contaminants from intake gas for the dry gas seal.

The invention also extends to a method of reducing or eliminating contaminants from intake gas for a dry gas seal, comprising the method of the third, fourth, seventh, eighth, eleventh, twelfth, or fourteenth of the invention (optionally including any of the optional features set out above).

Cleaning of Compressed Gas from Compressors

It is common for compressors to bleed lubricants into the compressed gas. Over time, rubber particulate matter from worn seals can also make its way into compressed gas. The lubricant and rubber particles collect in gas lines downstream of the compressor, and can create a fire and explosion hazard. Therefore, it is highly desirable to eliminate lubricant and rubber particles from the compressed gas. Current solutions are prohibitively expensive and have high operation costs.

Installing a separator as disclosed herein at the outlet of the compressor is a relatively cheap and efficient way to remove lubricant and rubber particles from the compressed gas.

One particular example of use of compressors is in sub-sea seismic exploration. Here, ship-board compressors take in gas, compress it, and store the compressed gas in a holding tank. The holding tank feeds the compressed gas to a manifold which splits the gas to 8 to 12 lines. Each line can be up to 1.5 km long, and trails behind the ship. Each line terminates in a cannon that releases the gas in a burst, creating the seismic shock that is recorded in order to carry out the sub-sea seismic exploration.

A separator can be installed before or after the manifold, in order to reduce the presence of lubricant, rubber particles and other possible contaminants from the compressed gas in the lines.

The invention therefore extends to a compressor system comprising a compressor with an outlet for compressed gas, and the separator of the first, second, fifth, sixth, ninth, tenth, or thirteenth aspect of the invention (optionally including any of the optional features set out above). The separator is configured to reduce or eliminate contaminants from compressed gas from the outlet of the compressor.

The invention also extends to a method of reducing or eliminating contaminants from compressed outlet gas from a compressor, comprising the method of the third, fourth, seventh, eighth, eleventh, twelfth, or fourteenth aspect of the invention (optionally including any of the optional features set out above).

Cleaning of Exhaust from a Ship

Pollution from marine diesel engines on commercial ships is a concern. Of particular concern is the production of NOx gases. Reducing the combustion temperature in the engine is known to reduce the production of NOx gases. One way to reduce the combustion temperature is to channel a small portion of a ship's exhaust into a fan/turbo compressor that blows the exhaust directly back into the combustion process (this is known as exhaust gas recirculation, ERG). However, the exhaust contains particles and liquids (mainly from the exhaust cleaning process that all ships are required to use, as discussed below) that over time destroy the fan/compressor.

A separator as disclosed herein can be used to remove the liquid and particle contaminants. In order to remove the finest carbon particles, the exhaust gas flow can be sprayed with a liquid such as water and detergents/surfactants. This allows the fine carbon particles to be captured by the water droplets, to then be separated from the gas flow.

The flow of gas in ERG may be in the region of 20,000 $m^3$/hour. For this reason, a number of separators may be provided in parallel in order to provide the necessary capacity.

The invention therefore extends to an exhaust gas recirculation system comprising a fan which receives a portion of an exhaust flow (optionally from a ship) through an intake, and the separator (optionally a plurality of separators) of the first, second, fifth, sixth, ninth, tenth, or thirteenth aspect of the invention (optionally including any of the optional features set out above). The separator is configured to reduce or eliminate contaminants from the exhaust flow prior to the exhaust gas flow entering the intake.

Instead of a fan, a turbo compressor may be used.

The invention also extends to a method of reducing or eliminating contaminants from an exhaust flow (optionally from a ship) for supply back into a combustor, comprising the method of the third, fourth, seventh, eighth, eleventh, twelfth, or fourteenth aspect of the invention (optionally including any of the optional features set out above).

Scrubbing of Exhaust from Ships

To comply with new rules for sulphur and NOx gas emissions, the exhaust produced by ships must be cleaned. This is performed by showering the exhaust with brine, such as seawater. The salt allows interaction with NOx and SOx, and soot. Before venting the exhaust, the liquids must be removed from the exhaust gas. Current solutions are not able to perform this function effectively. However, a separator as disclosed herein would be ideal.

The flow of gas in a ship's exhaust may be in the region of 1,000,000 $m^3$/hour. For this reason, a number of separators may be provided in parallel in order to provide the necessary capacity.

The invention therefore extends to an exhaust gas scrubbing system (optionally on board a ship) comprising an engine exhaust flow for being exhausted to the atmosphere through an outlet, and the separator (optionally a plurality of separators) of the first, second, fifth, sixth, ninth, tenth, or thirteenth aspect of the invention (optionally including any of the optional features set out above). The separator is configured to reduce or eliminate contaminants from the exhaust flow prior to the exhaust flow exiting the outlet.

The invention also extends to a method of reducing or eliminating contaminants from an engine exhaust flow (optionally from a ship) prior to exhausting the engine exhaust flow to the atmosphere, comprising the method of the third, fourth, seventh, eighth, eleventh, twelfth, or fourteenth aspect of the invention (optionally including any of the optional features set out above).

Cleaning of Restaurant Kitchen Ventilated Air

Fatty deposits in kitchen ventilation systems cause over 5000 fires per year in restaurants in the USA alone. Ineffective removal of fat droplets from ventilation air is therefore a significant concern. A separator as disclosed herein is able to remove effectively the fat droplets from the ventilation air.

The invention therefore extends to a kitchen ventilation system comprising the separator (optionally a plurality of separators) of the first, second, fifth, sixth, ninth, tenth, or thirteenth aspect of the invention (optionally including any of the optional features set out above).

The invention also extends to a method of cleaning kitchen ventilation air comprising the method of the third, fourth, seventh, eighth, eleventh, twelfth, or fourteenth aspect of the invention (optionally including any of the optional features set out above).

BRIEF DESCRIPTION OF THE DRAWINGS

Certain exemplary embodiments will now be described in greater detail by way of example only and with reference to the accompanying drawings in which.

DETAILED DESCRIPTION

Figure 1:
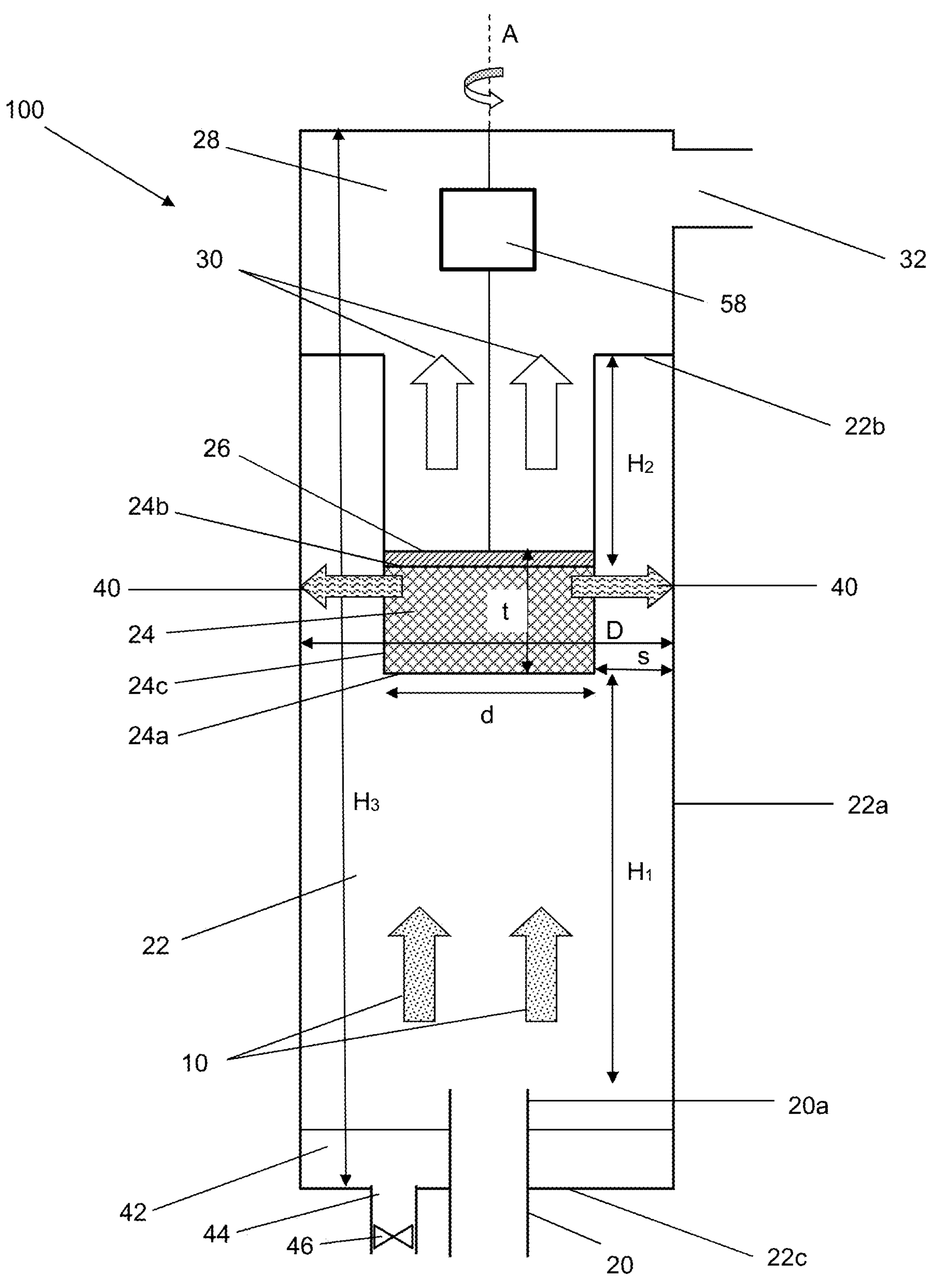
FIG. 1 shows a vertically-oriented separator.

FIG. 1 shows a gas/liquid separator 100. The separator comprises a first chamber 22 and a second chamber 28. Between the first chamber 22 and second chamber 28 is provided a mesh 24. The separator 100 receives a gas/liquid flow 10 (i.e. an inlet flow comprising gas containing entrained droplets of liquid). The gas/liquid flow 10 enters the first chamber 22 of the separator through an inlet 20, at an upstream end of the separator 100.

The mesh 24 comprises a metal foam, and is structurally self-supporting. The mesh 24 has an open-cell structure comprising a plurality of passageways formed from interconnected pores in the metal structure. The mesh 24 has a random cell structure. In this embodiment, the porosity (i.e. the volume of the pores divided by the total volume) of the mesh 24 is approximately 90%. The average pore diameter is 1 mm. The pore density is 10 ppi. In this embodiment, the mesh 24 comprises aluminium. The mesh 24 is rotated about an axis A by a motor 58.

The mesh 24 has a diameter d, and the first chamber 22 has a diameter D. In the present embodiment, the diameter d of the mesh is 150 mm and the diameter D of the first chamber is 250 mm. The distance s between the outer periphery 24*c* of the mesh 24 and the wall 22*a* of the first chamber 22 is 50 mm. The distance s and diameter d of the mesh are then related as follows: s=0.33d.

The mesh 24 is positioned such that the upstream surface 24*a* of the mesh 24 is a distance $H_1$ from the top of the inlet 20. In the present embodiment, the distance $H_1$ is twice the diameter of the mesh 24 (i.e. $H_1$=2d). Such an arrangement leads to good separation efficiency. In this embodiment, the distance $H_1$ is 300 mm.

The mesh 24 is positioned such that the downstream surface 24*b* of the mesh 24 is a distance $H_2$ from the top 22*b* of the first chamber 22. In the present embodiment, the distance $H_2$ is equal to the diameter of the mesh 24 (i.e. $H_2$=d). Such an arrangement leads to good separation efficiency. In this embodiment, the distance $H_2$ is 150 mm.

In this embodiment, the thickness t of the mesh 24 is 100 mm. The thickness t and diameter d of the mesh are then related as follows: t=0.67d. The mesh rotates at approximately 3,000 rpm.

As the gas/liquid flow 10 passes through the mesh 24, the liquid is centrifuged and coalesces within the pores of the mesh 24. The flow of coalesced liquid 40 is forced radially outwards towards the outer periphery 24*c* of the mesh 24 by the centrifugal force generated as a result of the rotation of the mesh 24. The flow of coalesced liquid 40 is spun across the gap between the outer periphery 24*c* of the mesh 24 and the wall 22*a* of the first chamber 22, and collects on the wall 22*a* of the first chamber 22. The flow of coalesced liquid 40 then flows down the wall 22*a* of the first chamber 22, to collect in the liquid collection reservoir 42 in the base of the first chamber 22. The liquid collection reservoir 42 is an annular space defined by the wall 22*a* and base 22*c* of the first chamber 22 and the outer wall 20*a* of the inlet 20. Liquid (also possibly including solid particles) collected in the liquid collection reservoir 42 can be drained away through drainage pipe 44, which in this example, includes a valve 46.

Meanwhile, the flow of gas 30, which no longer contains liquid contaminants, passes axially through the mesh 24, into a second chamber 28 and out of the second chamber 28 through an outlet 32. Whilst flow through the first chamber 22, mesh 24 and second chamber 28 is generally axial, flow out of the outlet need not be in the axial direction, i.e. the outlet 32 from the second chamber 28 can have any orientation. In FIG. 1, the outlet 32 is perpendicular to the axis of the separator.

At the downstream surface 24*b* of the mesh 24, around the outer periphery, is provided a seal 26 which prevents any flow into the second chamber 28, except through the mesh 24. In this embodiment, the seal 26 is a labyrinth seal. However, other types of seal may alternatively be used, or no seal may be present.

The separator 100 shown in FIG. 1 is vertically oriented, such that the first chamber 22 is arranged vertically below the second chamber 28, and the inlet 20 to the separator comprises a vertically oriented pipe which protrudes vertically upwards into the first chamber 22 in the direction towards the mesh 24. Flow through the separator 100 then broadly follows the upwards vertical direction, and liquid separated from the multi-phase flow collects in a collection reservoir 42 at the base of the first chamber 22, where the liquid collection reservoir 42 is an annular space defined by the wall 22*a* and base 22*c* of the first chamber 22 and the outer wall 20*a* of the inlet 20.

Figure 2:
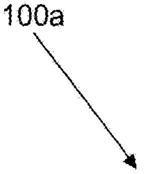
FIG. 2 shows a horizontally-oriented separator.
Figure 2:
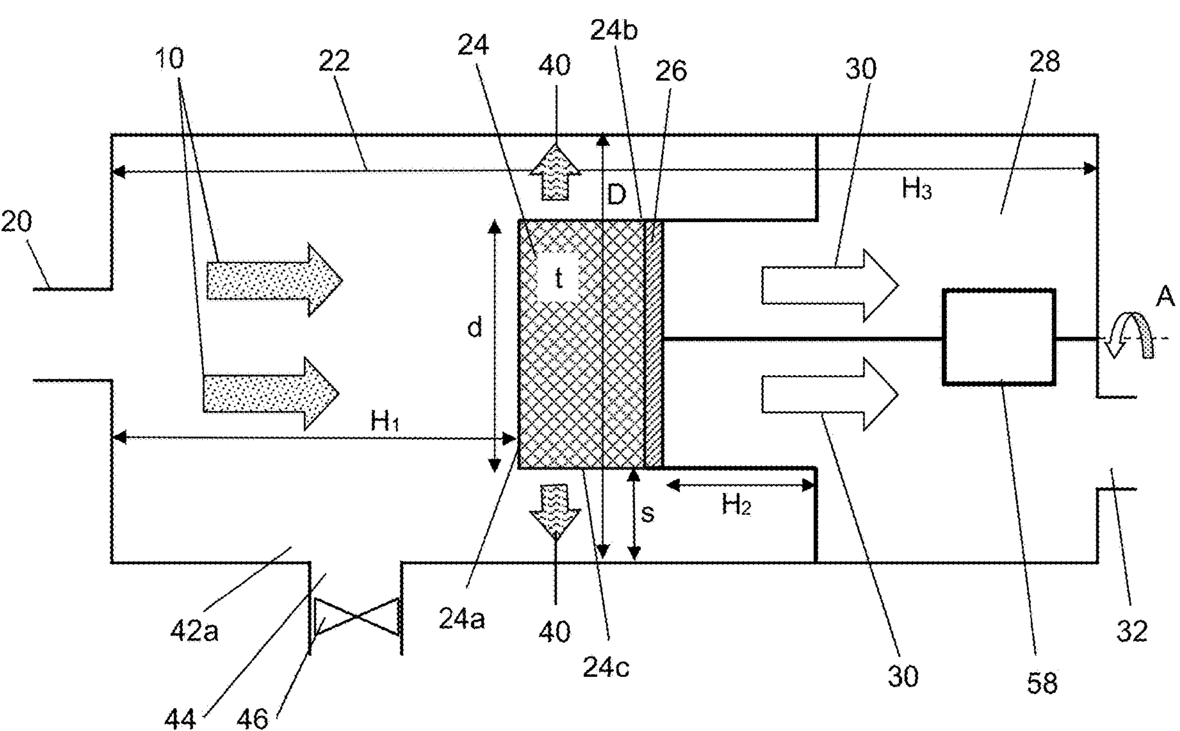

The separator 100*a* shown in FIG. 2 is similar to the separator 100 shown in FIG. 1, and like features are not explained in detail again here. Instead, differences between the two embodiments will be explained. Whilst the separator 100 shown in FIG. 1 is vertically oriented, the separator 100*a* shown in FIG. 2 is horizontally oriented. Flow through the separator 100*a* broadly follows the horizontal direction, from left to right as shown in FIG. 2. In this embodiment, rather than the inlet 20 being a vertically oriented pipe, it is instead a horizontally oriented pipe. The bottom of the first chamber 22 forms a liquid collection reservoir 42*a*, with a drain to drain off the collected liquid.

Whatever the orientation of the separator, flow from the inlet 20 to the first chamber 22, through the mesh 24 and into the second chamber 28 is in a broadly axial direction.

Figure 3:
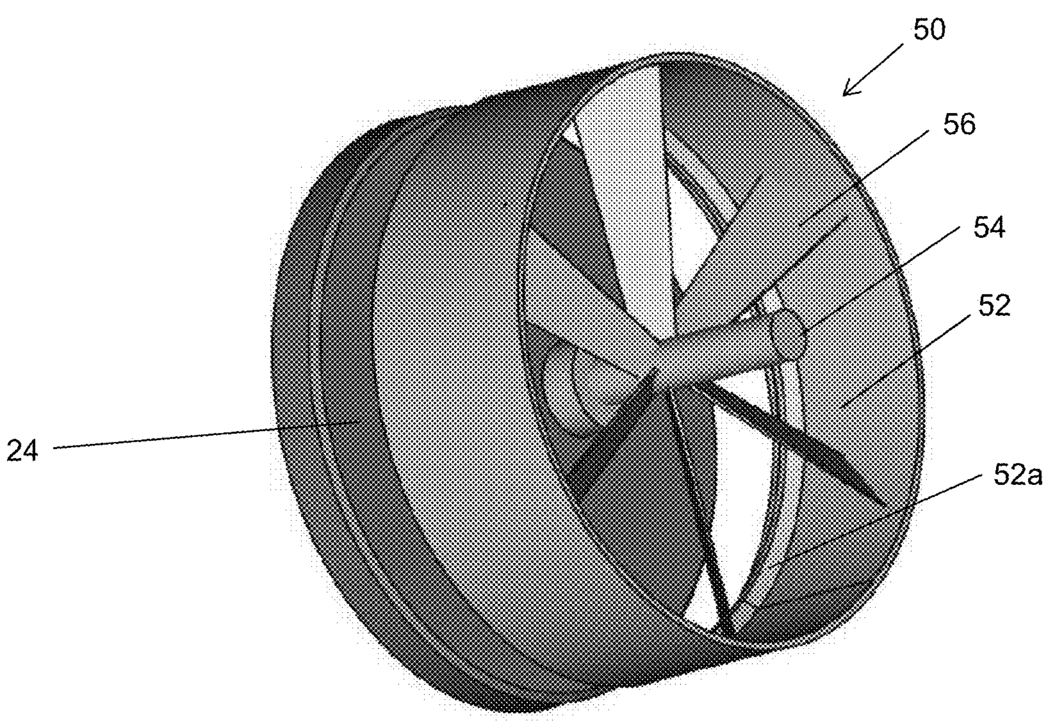
FIG. 3 shows a mesh holder for the mesh of a separator.
Figure 4:
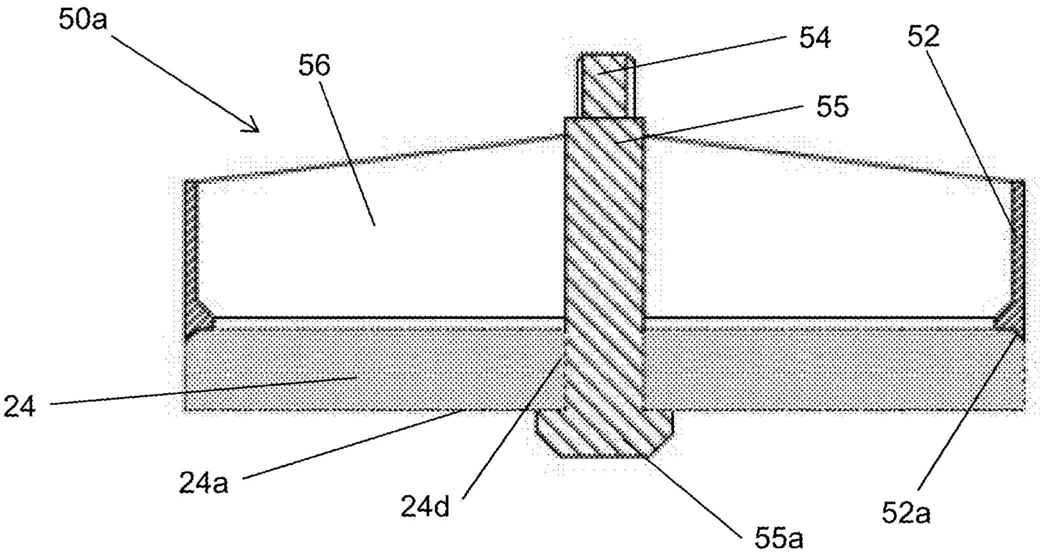
FIG. 4 shows a mesh holder for the mesh of a separator.

FIGS. 3 and 4 show mesh holders 50, 50*a* for the mesh 24 of a separator. Either mesh holder 50, 50*a* may be used in any of the separators described herein, but the use of such a mesh holder is not essential to the operation of the described separators. The mesh may be held by any form of support structure which allows the mesh to be rotated.

FIG. 3 shows a perspective view of a first mesh holder 50, with the mesh 24 shown slightly withdrawn from its position within the mesh holder 50, to aid visibility of the structure.

The mesh holder 50 comprises a rigid cylindrical body portion 52 extending between a first end and a second end. The second end comprises a plurality of fan blades 56 (in this case, six blades) extending inwardly from the cylindrical body portion 52. These fan blades 56 are configured such that the mesh holder 50 operates as an axial fan when the mesh holder 50 is rotated, thereby compensating (at least partially) for the pressure loss through the mesh 24, and helping to draw flow through the mesh 24. The mesh holder 50 comprises a central axle 54, and the fan blades 56 extend from the cylindrical body portion 52 inwardly to the central axle 54.

At the first end of the rigid cylindrical body portion 52, the mesh holder 50 is open so as to receive the mesh. The cylindrical body portion 52 overlaps the outer periphery of the mesh 24 at the downstream end of the mesh 24, so that the mesh 24 is inserted a short distance into the first end of the cylindrical body portion 52 (for example, 5 mm). The mesh holder 50 provides a rigid outer support for the mesh 24. The cylindrical body portion 52 comprises a slanted inner lip 52*a* to drain away any liquid reaching the mesh perimeter at this location towards the sides of the mesh 24 which are not covered by the cylindrical body portion 52. The slanted inner lip 52*a* also defines the extent to which the mesh 24 can be inserted into the mesh holder 50—when the mesh 24 abuts against the inner lip 52*a*, it cannot move further into the mesh holder 50.

In this embodiment, the mesh 24 is glued round its outer periphery to secure it within the mesh holder 50. Alternatively, the mesh is not glued, but is secured by a tight interference fit with the mesh holder 50. Securing the mesh around its periphery (either by adhesive or using an interference fit) means that there is no overlap between the mesh holder 50 and the upstream face of the mesh 24. Any overlap with the mesh holder 50 and the upstream face of the mesh 24 results in a degree of blinding of the mesh 24 to the flow into the mesh 24, and this is generally to be minimised or avoided. The mesh 24 and mesh holder 50 may also be adhered to each other where the central axle 54 of the mesh holder 50 abuts against the downstream face of the mesh 24 received within the mesh holder 50.

FIG. 4 shows a cross-sectional view of a similar mesh holder 50*a* with the mesh 24 in the installed position within the mesh holder 50*a*. This mesh holder 50*a* differs from the mesh holder shown in FIG. 3 by virtue of the means of attachment between the mesh 24 and the mesh holder 50*a*. In the embodiment shown in FIG. 4, the mesh 24 comprises a through-hole 24*d* coaxial with a central axis of the mesh. The mesh 24 is secured to the mesh holder 50*a* with a fastener 55 which passes through the through-hole and fastens to the central axle 54 of the mesh holder 50*a*. The fastener comprises a wide end portion 55*a* that is wider than the through-hole 24*d*, which abuts the upstream face 24*a* of the mesh 24.

Figure 5:
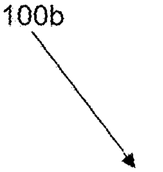
FIG. 5 shows a separator comprising a mesh holder.
Figure 5:
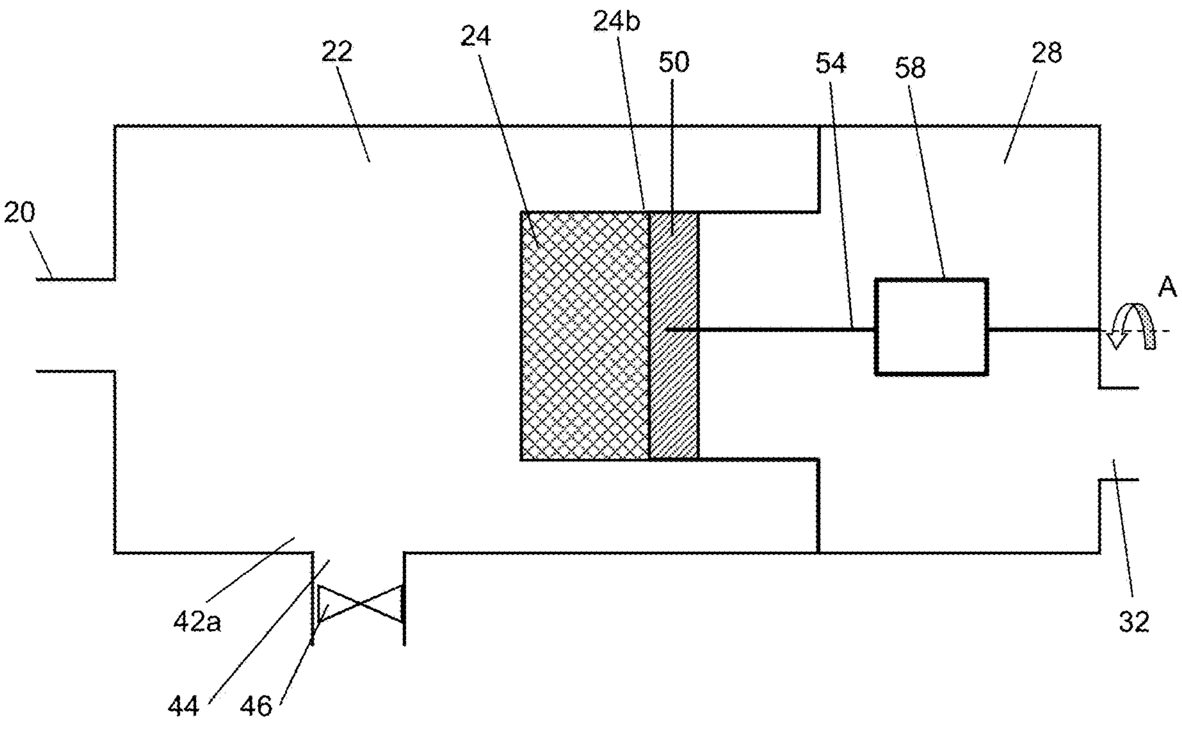

FIG. 5 shows the mesh holder 50 of FIG. 3 in a horizontal separator 100*b* (but equally the mesh holder 50*a* of FIG. 4 could be used, and/or the separator could be vertically-oriented). The central axle 54 of the mesh holder 50 is integral with an output shaft of the motor 58. Alternatively, the central axle 54 of the mesh holder 50 could be rotated by the motor output shaft via a magnetic coupling between the central axle 54 and the output shaft.

As also shown in FIG. 5, an outer periphery of the cylindrical body portion 52 of the mesh holder 50 forms a sealing surface that contacts an inner wall of the second chamber.

As noted above, the mesh holder is configured with fan blades 56 to act as an axial fan when rotated, to help draw the multi-phase flow into the mesh 24, and the separated gas-flow out of the mesh 24. This compensates (at least partially) for pressure losses through the mesh 24.

Figure 6:
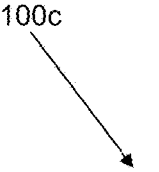
FIGS. 6 and 7 show a separator comprising a fan.
Figure 6:
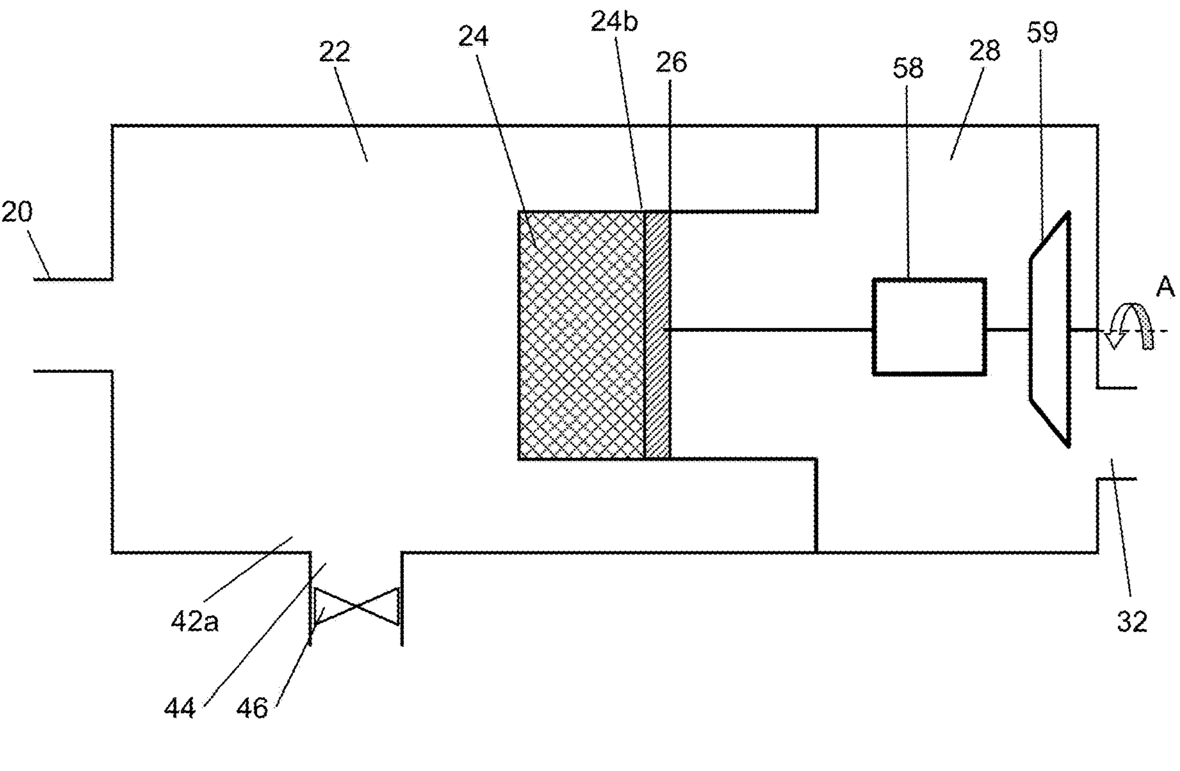
Figure 7:
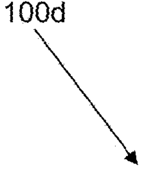
Figure 7:
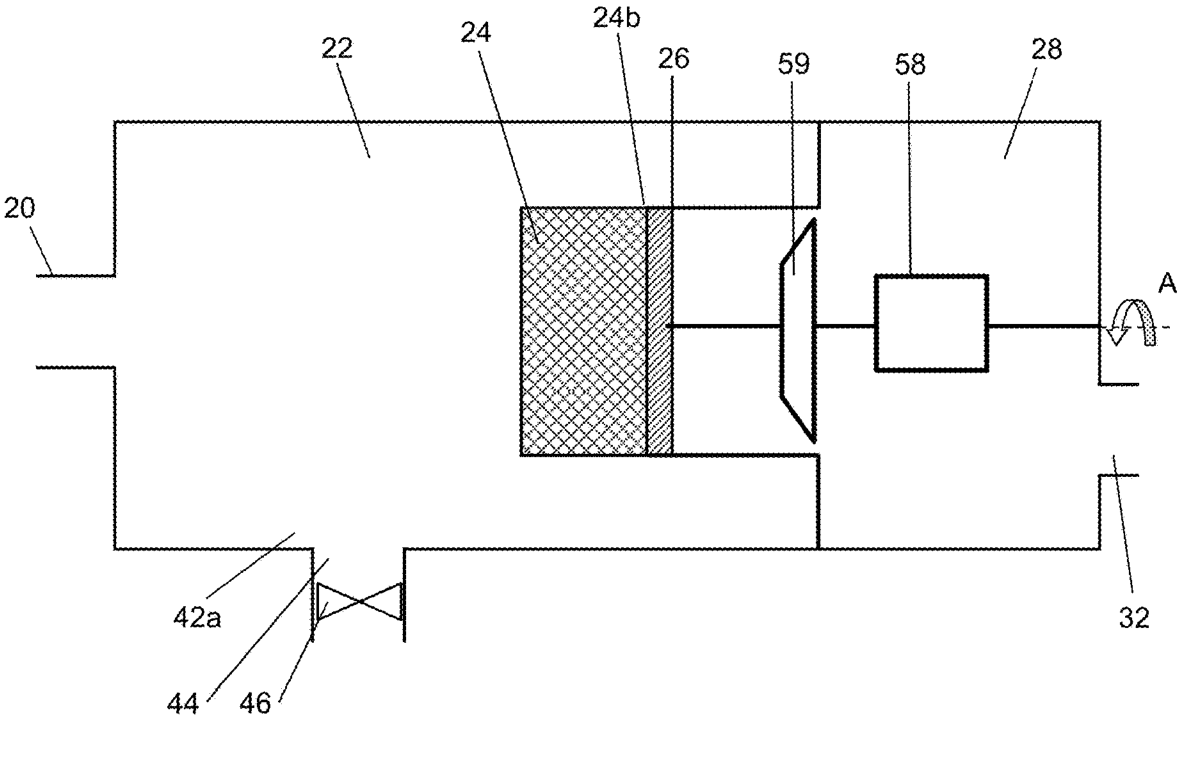

As an alternative to integrating an axial fan with the mesh holder, the axial fan functionality can be moved away from the mesh holder, by providing axial fan blades separately from the mesh holder. This is shown in FIGS. 6 and 7. In FIG. 6, the separator 100*c* comprises a fan 59 provided on a motor shaft on the opposite side of the motor 58 from the mesh 24. In FIG. 7, the separator 100*d* comprises a fan 59 provided on a motor shaft between the motor 58 and the mesh 24. In both cases, the motor 58 is arranged to drive rotation of both the mesh 24 and the fan 59. The fan 59 in either case may have any configuration suitable for producing an appropriate pressure change. The fan 59 may have between 2 and 10 blades, for example 6 blades.

Whilst FIGS. 6 and 7 show horizontally-oriented separators, clearly the configuration of the fan 59 and motor 58 illustrated therein could equally be applied within a vertically-oriented separator.

Figure 8:
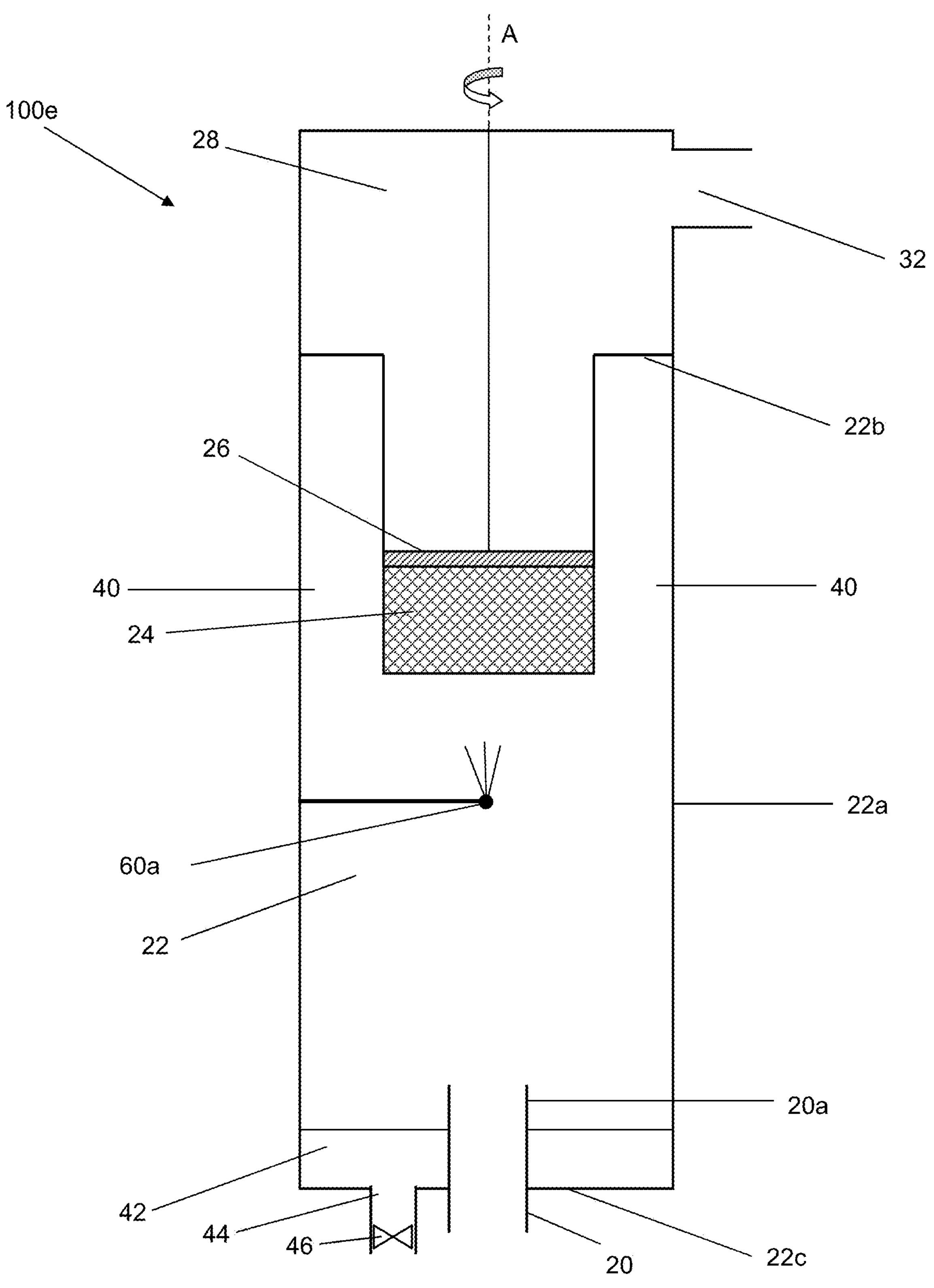
FIGS. 8 to 10 show means for adding liquid within a separator.
Figure 9:
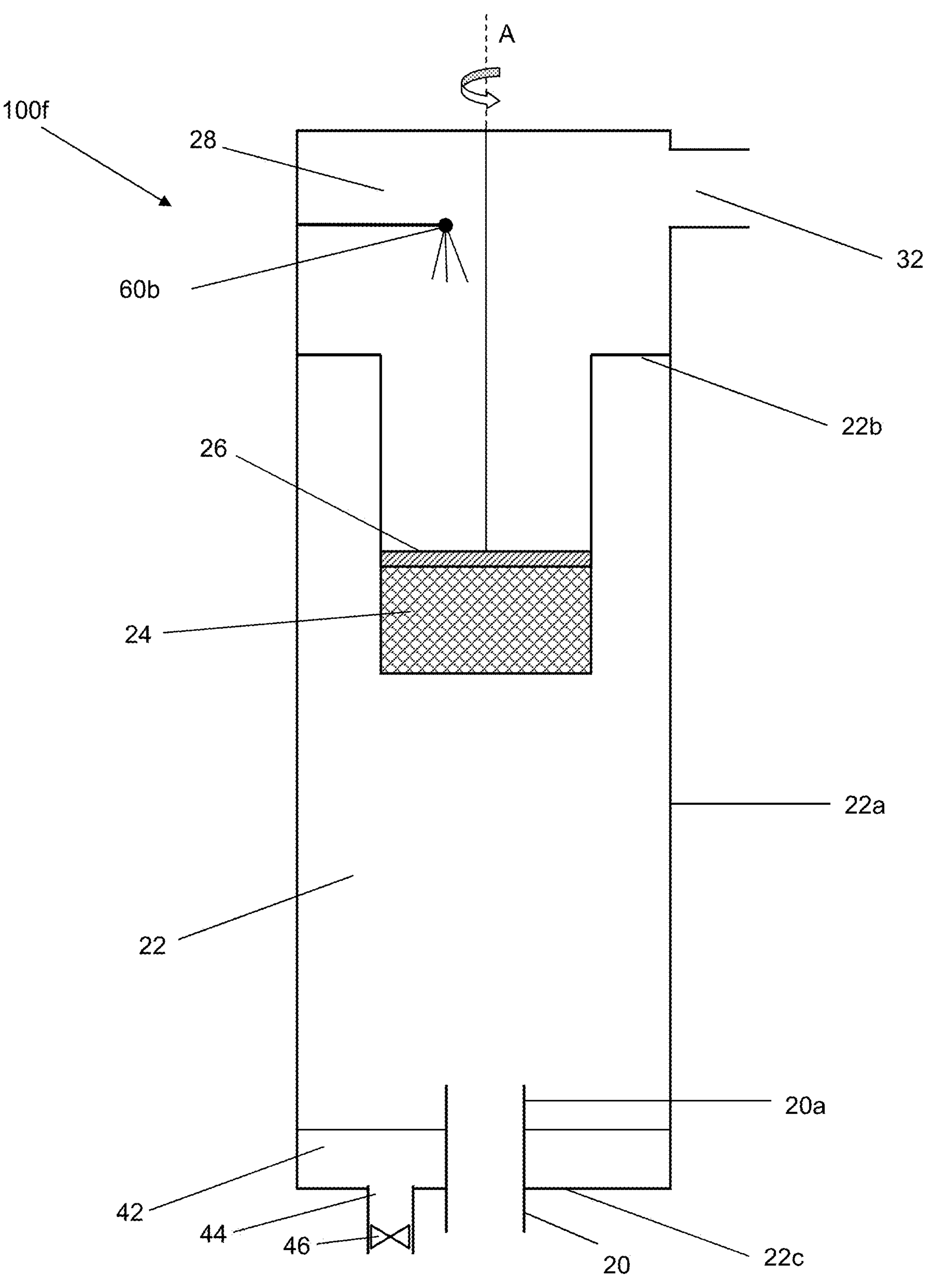
Figure 10:
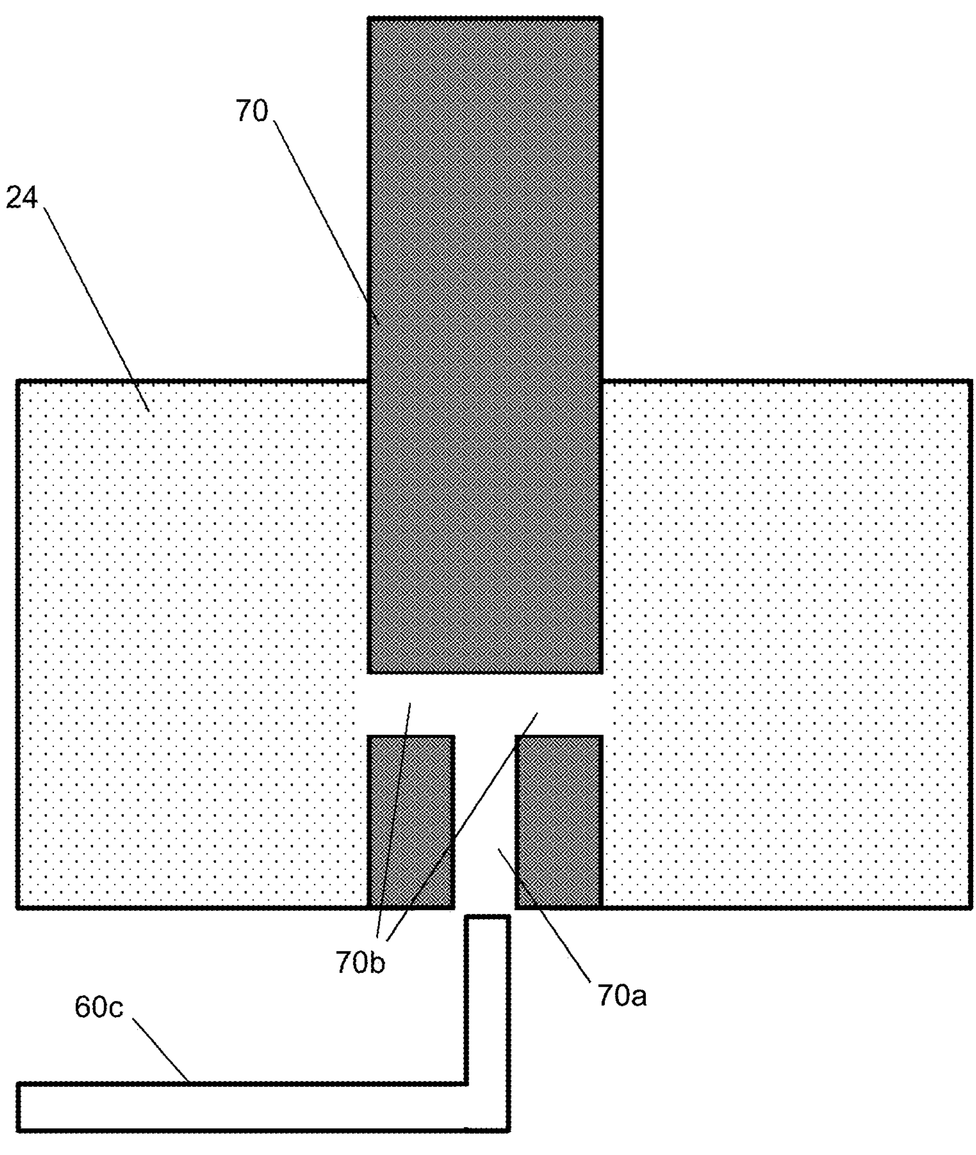

FIGS. 8, 9 and 10 show possible configurations for separators incorporating a nozzle or a plurality of nozzles for spraying a liquid into inlet flow or onto the mesh. This can be done to achieve one or more of the following effects:

1) cleaning of the mesh, by removing accumulated contaminants stuck to the mesh;
2) wetting the mesh surface, so that contaminants have difficulty sticking, thereby maintaining the mesh in a clean state;
3) capturing solid particles or oil-based droplets within liquid droplets, to allow the solid/oil-based particles to be separated from the multi-phase flow;
4) capturing a particular gas within liquid droplets, to allow that gas to be separated from the multi-phase flow; and
5) fire suppression.

The liquid sprayed into the inlet flow or onto the mesh comprises one of more of: water, detergent, surfactant, alcohol, fire-suppressant. This can be chosen taking into consideration the particular use of the separator, the types of particles present in the inlet flow, and the likely problems that these pose.

The separators of FIGS. 8, 9 and 10 incorporate a reservoir (not shown) for holding the liquid to be added and a pump (also not shown) for pumping the liquid from the reservoir to the nozzle.

FIG. 8 shows a separator 100*e* comprising a nozzle 60*a* upstream of the mesh 24. A nozzle positioned here sprays additional liquid into the inlet flow, allowing contaminants to be entrained in droplets of the additional liquid before they hit the mesh 24. Because the nozzle 60*a* is upstream of the mesh, liquid can be added during operation of the separator; any added liquid is then separated from the gas flow via the mesh, in the same way that liquid present in the inlet flow is separated from the gas-flow.

FIG. 9 shows a separator 100*f* comprising a nozzle 60*b* downstream of the mesh 24. In this case, liquid is only added through the nozzle 60*b* when the separator is not operational, since otherwise, liquid is added back into the separated gas flow. Providing a nozzle 60*b* in this location allows the mesh to be cleaned when the separator is not operating.

FIG. 10 shows an alternative configuration for a nozzle, referred to as an "at-mesh" configuration. Here, the mesh 24 is mounted on an axle 70, and the axle 70 comprises a blind central bore 70*a* running a short distance into the axle 70. Two (or more) radial passages 70*b* run from the central bore 70*a* out of the axle 70. The radial passages 70*b* exit the axle 70 at positions which overlap with the mesh 24, i.e. the mesh 24 covers over the radial passages 70*b*. A pipe 60*c* is configured to spray liquid up into the central bore 70*a*, through the radial passages 70*b*, and into the interior of the mesh. Such a configuration allows the mesh to be cleaned when the separator is not operating. Additionally, liquid can be sprayed into the mesh during operation of the separator. Any liquid added into the mesh in this way is separated from the separated gas stream under the action of the mesh.

In each case, the particular characteristics of the liquid addition (for example, the flow rate, droplet size produced by the nozzle(s), and the spray pattern (for example, flat fan, full cone, and mist)) can be chosen according to the particular characteristics of the multi-phase flow received by the separator.

The additional liquid added into the separator can be drained away via the same drain system incorporated into the separator to drain off any non-gas phase separated out of the multi-phase flow. Drainage may be continuous, particularly in cases where additional liquid is added continuously to the multi-phase flow during operation of the separator.

Whilst the nozzles shown in FIGS. 8 and 9 are incorporated into vertically-oriented separators, they could of course be integrated into horizontally-oriented separators (or separators with any orientation). Moreover, nozzles of the kind shown in FIGS. 8, 9 and 10 may be provided all three together or in any combination of two of the nozzles in one separator. Any number of nozzles can be provided at any of the upstream, downstream or at-mesh locations.

Figure 11:
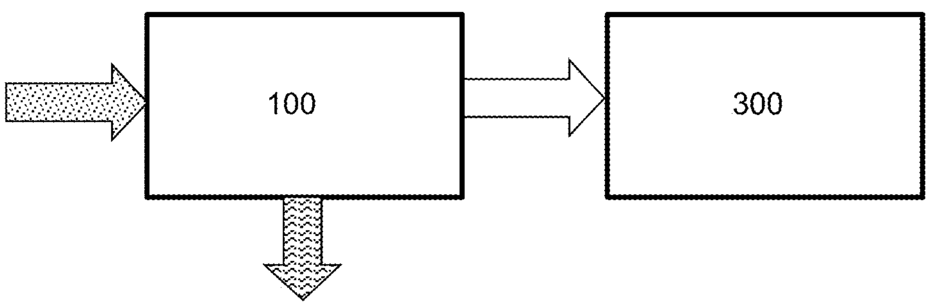
FIG. 11 shows a separator included in a compressor system.

FIG. 11 shows a separator 100 included upstream of the inlet of a compressor 300. Intake gas for use by compressors 300 may not always be clean. In particular, it may include liquids and solid particles. Over time, these may cause damage to the internal components of the compressor 300. Installing a separator 100 as disclosed herein prior to the compressor 300 intake can largely eliminate such contaminants from the intake gas.

Figure 12:
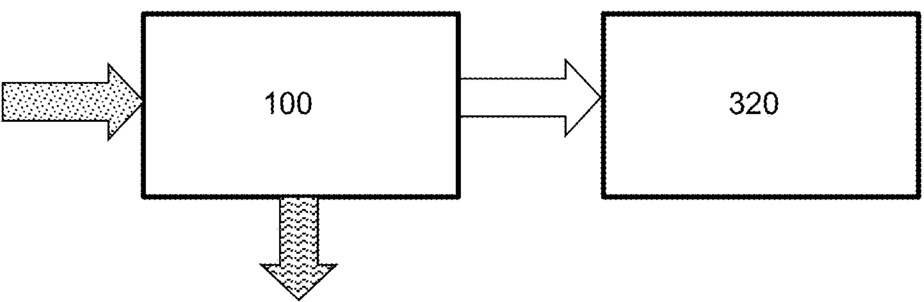
FIG. 12 shows a separator included in a dry gas seal system.

FIG. 12 shows a separator 100 included upstream of an intake to a dry gas seal 320. For the dry gas seal 320 to operate correctly and safely, the feed gas must be very dry and clean. Installing a separator 100 as disclosed herein to process the feed gas prior to feeding it to the dry gas seal 320 can largely eliminate contaminants from the feed gas.

Figure 13:
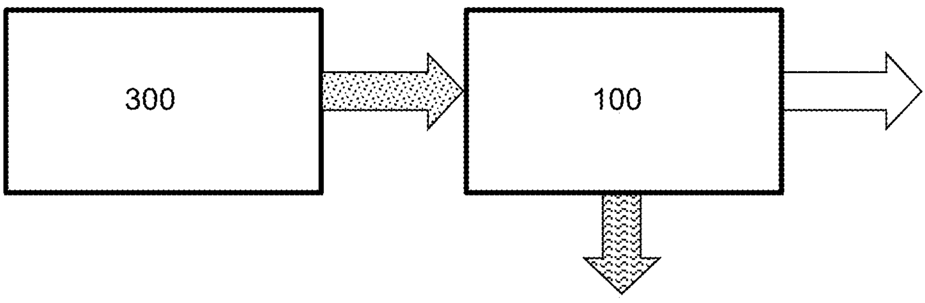
FIG. 13 shows a separator included in a compressor system.

FIG. 13 shows a separator 100 included downstream of an outlet of a compressor 300. It is common for compressors 300 to bleed lubricants into the compressed gas. Over time, rubber particulate matter from worn seals can also make its way into compressed gas. The lubricant and rubber particles collect in gas lines downstream of the compressor, and can create a fire and explosion hazard. Installing a separator 100 as disclosed herein at the outlet of the compressor 300 is a relatively cheap and efficient way to remove lubricant and rubber particles from the compressed gas.

Figure 14:
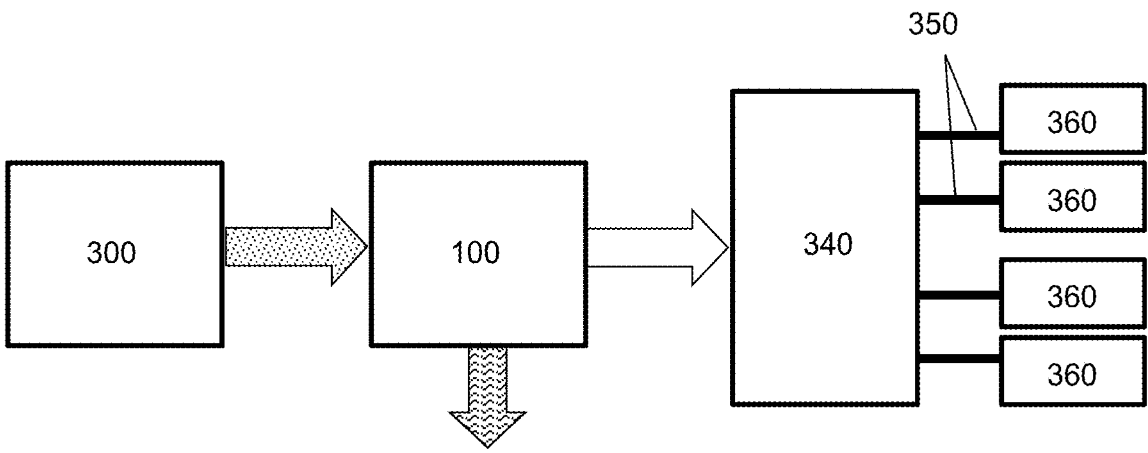
FIG. 14 shows a separator included in a seismic shock system for sub-sea seismic exploration.

FIG. 14 shows a separator 100 included in a seismic shock system for sub-sea seismic exploration. The system comprises a compressor 300 which feeds compressed gas to a manifold 340. Gas lines 350 downstream of the manifold 340 extend to cannons 360 that release the compressed gas in a burst, creating the seismic shock that is recorded in order to carry out the sub-sea seismic exploration. A separator 100 can be installed before or after the manifold 340 (installation upstream of the manifold 340 is shown in FIG. 14), in order to reduce the presence of lubricant, rubber particles and other possible contaminants from the compressed gas in the gas lines 350.

Figure 15:
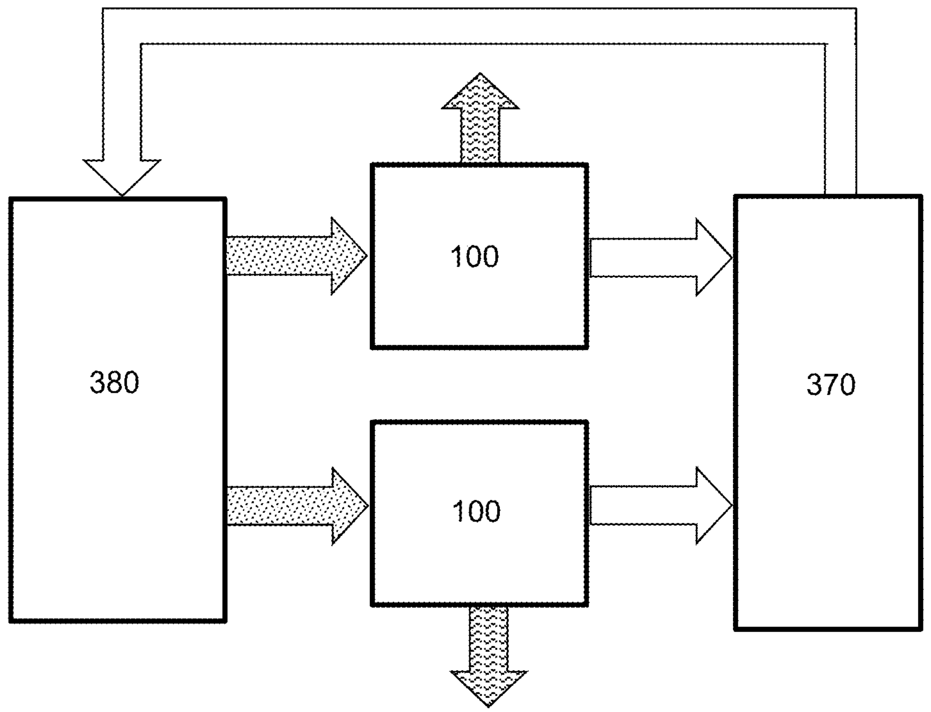
FIG. 15 shows a separator included in an exhaust gas recirculation system.

FIG. 15 shows two parallel separators 100 (of course a greater number of separators could be used in parallel) in an exhaust gas recirculation system. Such a system takes a portion of the exhaust gas from an engine 380 (in this example, a marine diesel engine), cleans it in the separators 100, then feeds the cleaned gas to a fan/turbo compressor 370 which feeds the cleaned gas back into the engine 380. This reduces the combustion temperature in the engine 380, and thereby reduces the production of pollutant NOx gases.

The exhaust contains particles and liquids, and if the exhaust is not cleaned in the separators 100, these contaminants can eventually destroy the fan/compressor 370. In order to remove the finest carbon particles, the exhaust gas flow can be sprayed (for example, within the separator) with a liquid such as water and detergents/surfactants. This allows the fine carbon particles to be captured by the water droplets, to then be separated from the gas flow.

Figures 16, 17:
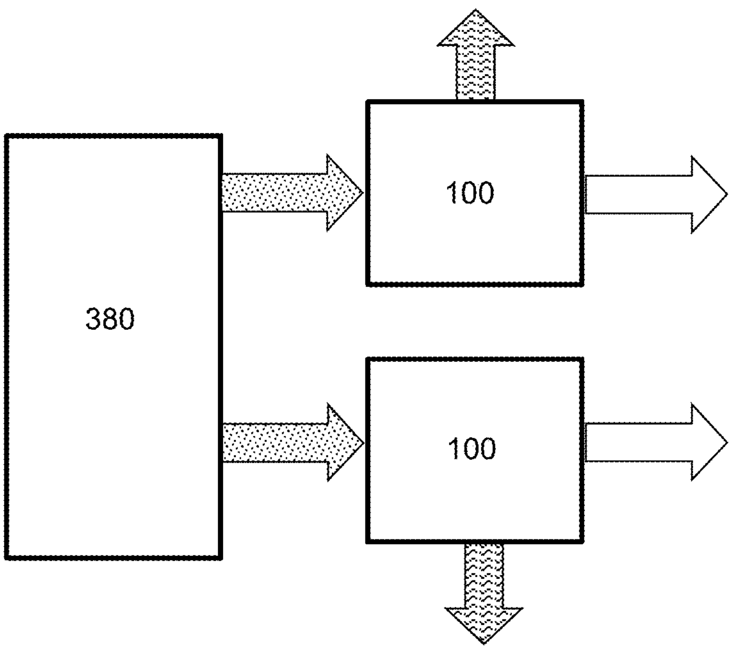
FIG. 16 shows a separator included in an exhaust gas cleaning system.
FIG. 17 shows a separator included in a kitchen ventilation system.

FIG. 16 shows two parallel separators 100 (of course a greater number of separators could be used in parallel) in an exhaust gas scrubbing system. Such a system takes the exhaust gas from an engine 380 (in this example, a marine diesel engine), showers it with brine in a chamber that allows misted brine to interact with the exhaust flow for around 1 to 3 seconds before it arrives in the separator, cleans it in the separators 100, then exhausts it to the atmosphere.

FIG. 17 shows a separator 100 in a kitchen ventilation system. Using cooking equipment 400 produces air laden with water vapour and fat droplets etc. Fatty deposits in kitchen ventilation systems are a serious fire risk and so ideally, such particles should be removed from the air entering the ventilation system. As shown in FIG. 17, air is drawn into a ventilation hood 410 and through a separator 100. The separator 100 separates liquids and fat droplets from the air stream, and allows only clean air to flow into the ventilation duct 420.

Figure 18:
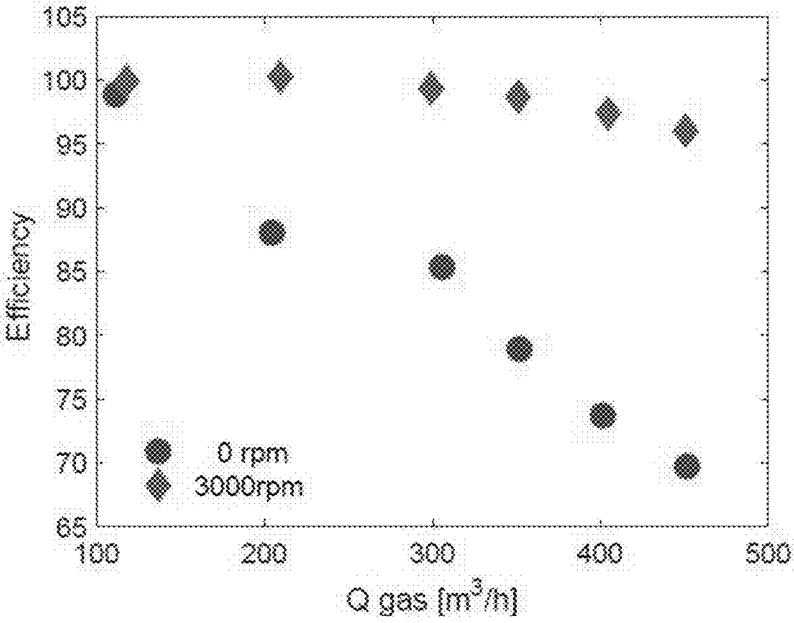
FIG. 18 shows efficiency as a function of the volumetric flow rate for a separator with a mesh rotating at 3000 rpm, and a separator with the mesh stationary.

FIG. 18 shows efficiency of a separator as a function of the gas flow rate Q (in $m^3$/hour) for two cases. Efficiency is defined as follows:

$$100 \times \frac{\text{mass of the non-gas phase separated from the multi-phase flow}}{\text{mass of the non-gas phase initially present in the multi-phase flow}}$$

In the first case, the mesh is rotated at 3000 rpm. Efficiency of the separator is above 95% for flow rates from 100 $m^3$/hour to around 450 $m^3$/hour. In the second case, the mesh is not rotated, and efficiency falls rapidly at higher flow rates.

Figure 19:
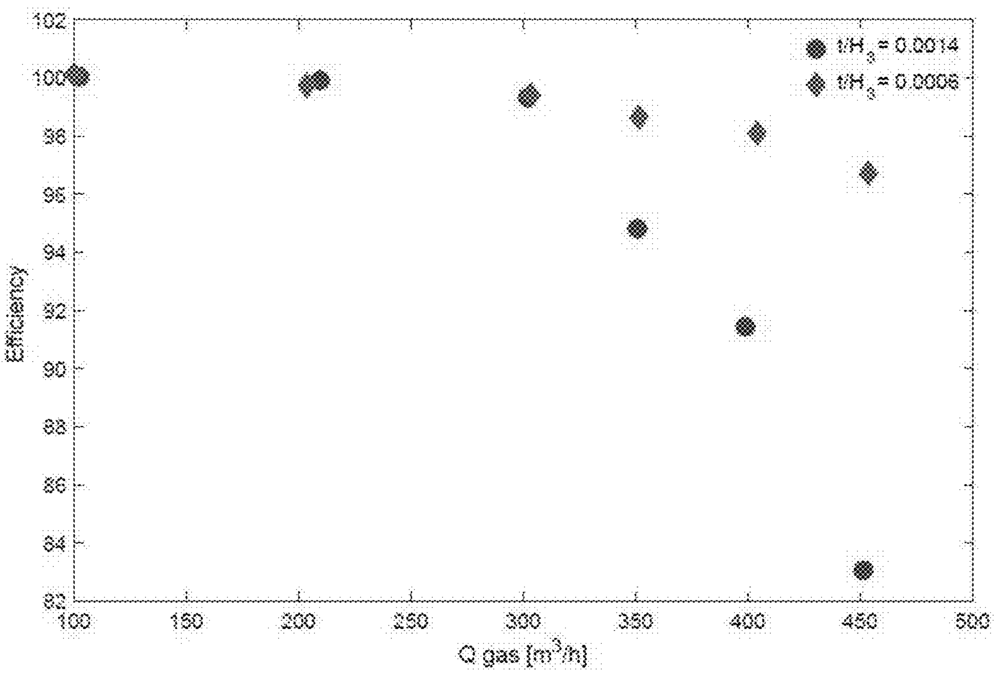
FIG. 19 shows efficiency as a function of the volumetric flow rate for separators with two different values of the parameter $t/H_3$.

FIG. 19 shows efficiency of a separator as a function of the gas flow rate Q (in $m^3$/hour) for two cases with different values of mesh thickness t (shown as a fraction of $H_3$, the total height of the separator vessel. In the first case, $t/H_3$ is 0.0014. In the second case, $t/H_3$ is 0.0006. More efficient separation is achieved in the second case (smaller mesh thickness) at higher flow rates.

Figure 20:
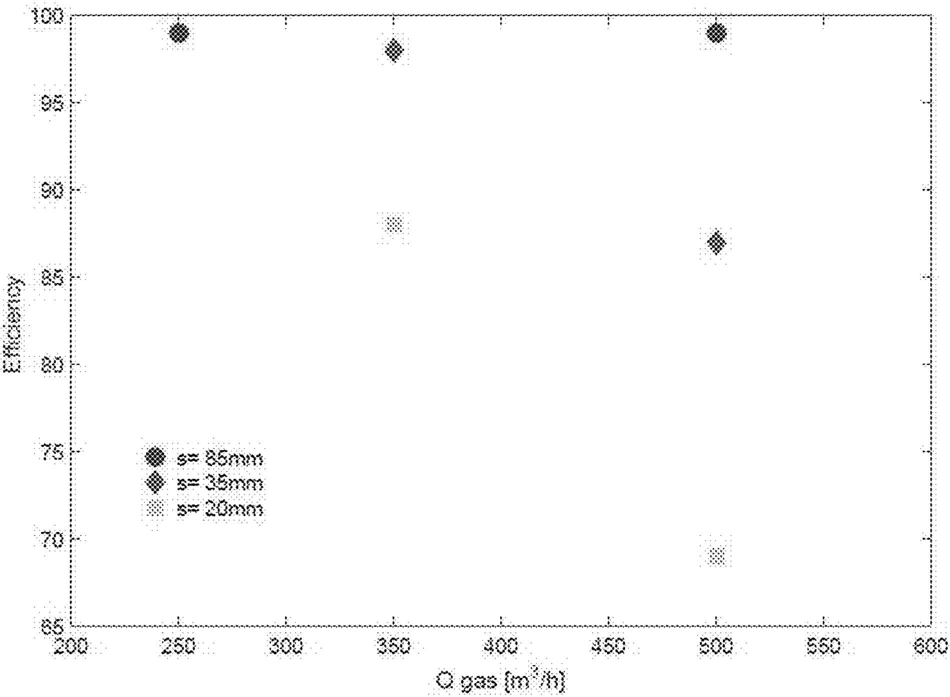
FIG. 20 shows efficiency as a function of the volumetric flow rate for separators with two different values of the parameter s.

FIG. 20 shows efficiency of a separator as a function of the gas flow rate Q (in $m^3$/hour) for three cases, each with a different value of s (the distance between the outer periphery of the mesh and the wall of the first chamber). Efficiency remains high even at high flow rates for the largest value of s.

Figure 21:
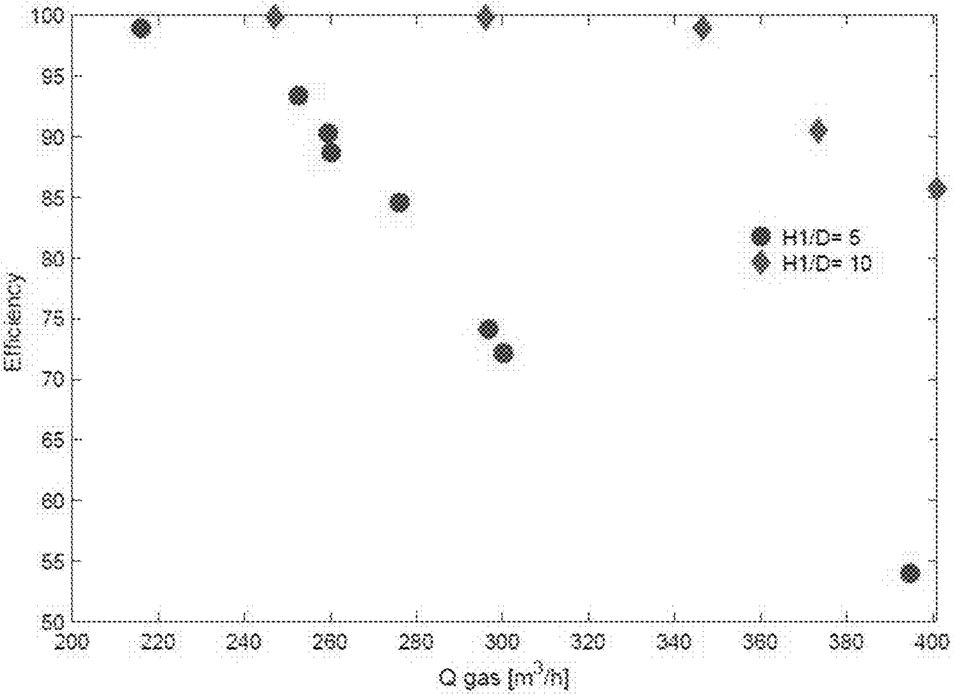
FIG. 21 shows efficiency as a function of the volumetric flow rate for separators with two different values of the parameter $H_1/D$.

FIG. 21 shows efficiency of a separator as a function of the gas flow rate Q (in $m^3$/hour) for two cases with different values of $H_1$, shown in comparison to D, the diameter of the separator. In the first case, $H_1/D$ is 5, and in the second case, $H_1/D$ is 10. The efficiency of separation is higher in the second case. This demonstrates that higher values of $H_1$ are advantageous.

The invention claimed is:

1. A separator for separating a multi-phase flow, the separator comprising:

a first chamber at an upstream end of the separator, the first chamber comprising a first surface with an inlet for an inlet flow to enter the first chamber, the first chamber further comprising a second surface opposite the first surface and an annular outer wall;

a second chamber at a downstream end of the separator, the second chamber comprising an outlet for a separated gas flow to exit the second chamber, the second chamber further comprising a section being defined by the second surface of the first chamber and a second chamber wall;

a mesh located between the first chamber and the second chamber for separating phases of the multi-phase flow, wherein the mesh is configured to receive the multi-phase flow from the first chamber at an upstream face of the mesh, and is configured to allow the separated gas flow to flow into the second chamber from a downstream face of the mesh, wherein the mesh is rotatable, wherein the upstream face of the mesh is spaced apart from the inlet into the first chamber by a distance $H_1$, wherein $H_1$ is related to the mesh diameter d by the following relationship:

$$H_1>0.5d;$$

wherein the second chamber wall at least partially projects into the first chamber such that the annular outer wall of the first chamber surrounds the second chamber wall by a distance $H_2$, wherein $H_2$ is related to a mesh diameter d of the mesh by the following relationship:

$$H_2>0.5d.$$

2. A separator according to claim 1, wherein $H_1$ is less than ten times the mesh diameter, or less than five times the mesh diameter, or less than three times the mesh diameter, or less than two times the mesh diameter.

3. A separator according to claim 1, wherein $H_2$ is less than ten times the mesh diameter, or less than three times the mesh diameter, or less than two times the mesh diameter, or is less than the mesh diameter d.

4. A separator according to claim 1, wherein the mesh diameter d is between 20 mm and 750 mm.

5. A separator according to claim 1, wherein the first chamber, mesh and second chamber are arranged such that flow through the first chamber to the mesh, and through the mesh to the second chamber is in an axial direction.

6. A separator according to claim 1, wherein flow through the first chamber to the mesh, and through the mesh to the second chamber is in a vertically upwards direction, and/or wherein the inlet projects into the first chamber through a bottom face of the first chamber, whereby a collection reservoir for collecting a non-gas phase from the multi-phase flow is defined at the bottom of the first chamber with an outer wall defined by the sidewall(s) of the first chamber, and an inner wall defined by the inlet, optionally wherein the collection reservoir comprises a drain for draining off the non-gas phase.

7. A separator according to claim 1, wherein flow through the first chamber to the mesh, and through the mesh to the second chamber is in a horizontal direction, and a collection reservoir for collecting a non-gas phase from the multi-phase flow is defined at the bottom of the first chamber, optionally wherein the collection reservoir comprises a drain for draining off the non-gas phase.

8. A separator according to claim 1, wherein the mesh has a pore density of between 10 ppi and 100 ppi.

9. A separator according to claim 1, wherein the mesh comprises an open-cell structure, optionally having either a random or regular pore structure.

10. A separator according to claim 1, wherein the first chamber and second chamber are pressure vessels, for separating a multi-phase flow pressurised to greater than atmospheric pressure, or for separating a multi-phase flow at lower than atmospheric pressure.

11. A separator according to claim 1, comprising a motor for rotating the mesh, wherein the motor comprises an output shaft, wherein the mesh is attached to the output shaft, or wherein the mesh is provided on a second shaft, and the second shaft is driven by the output shaft via a magnetic coupling.

12. A separator system comprising a plurality of separators according to claim 1, wherein the plurality of separators are arranged in parallel or in series.

13. A method of separating a multi-phase flow comprising:

flowing a multi-phase flow into an upstream face of a mesh provided in a first chamber of a separator, the first chamber comprising a first surface, an annular outer wall, and a second surface opposite the first surface, whereby a non-gas phase is forced radially out through interconnected pores in the mesh towards the periphery of the mesh, whilst a gas phase passes axially through the mesh, out of a downstream face of the mesh into a second chamber, wherein the mesh is rotatable, wherein the upstream face of the mesh is spaced apart from the inlet into the first chamber by a distance $H_1$, wherein $H_1$ is related to the mesh diameter d by the following relationship: $H_1>0.5$ d;

wherein the second chamber comprises a section being defined by the second top surface of the first chamber and a second chamber wall, wherein the second chamber wall at least partially projects into the first chamber such that the annular outer wall of the first chamber surrounds the second chamber wall by a distance $H_2$, wherein $H_2$ is related to the mesh diameter d of the mesh by the following relationship:

$$H_2>0.5d.$$

14. The method of claim 13 comprising the use of one of a) or b):

a) a separator comprising:

a first chamber at an upstream end of the separator, the first chamber comprising an inlet for an inlet flow to enter the first chamber;

a second chamber at a downstream end of the separator, the second chamber comprising an outlet for a separated gas flow to exit the second chamber;

a mesh located between the first chamber and the second chamber for separating phases of the multi-phase flow, wherein the mesh is configured to receive the multi-phase flow from the first chamber at an upstream face of the mesh, and is configured to allow the separated gas flow to flow into the second chamber from a downstream face of the mesh, wherein the upstream face of the mesh is spaced apart from the inlet into the first chamber by a distance $H_1$, wherein $H_1$ is related to the mesh diameter d by the following relationship:

$H_1 > 0.5d$; or b) a plurality of separators arranged in parallel or in series.

15. The method of claim 13, comprising separating gas from liquid entrained in the gas, and/or comprising separating gas from a suspension of solid particles captured in liquid droplets which are entrained in the gas and/or comprising separating a first gas from a second gas, wherein the first gas and second gas are present in a mixture of gases in the inlet flow, and the second gas is absorbed by the liquid droplets.

16. The method of claim 13, comprising rotating the mesh, optionally at a speed of 500 to 6,000 rpm.

17. The method of claim 13, wherein a flow rate of the multi-phase flow is 50 $m^3$/hour-30,000 $m^3$/hour.

18. The method of claim 13, comprising collecting and draining off a non-gas phase separated from the multi-phase flow.

* * * * *